(12) United States Patent
Landrith, II et al.

(10) Patent No.: US 10,337,638 B2
(45) Date of Patent: Jul. 2, 2019

(54) SLOW-SHIFT SPM VALVE

(71) Applicant: NATIONAL OILWELL VARCO, L.P., Houston, TX (US)

(72) Inventors: James Ray Landrith, II, Humble, TX (US); Frank B. Springett, Spring, TX (US); Eric Trevor Ensley, Cypress, TX (US); Jonathan Lewis Buelow, Houston, TX (US); James W. Weir, Houston, TX (US); Travis James Miller, Cypress, TX (US)

(73) Assignee: National Oilwell Varco, L.P., Houston, TX (US)

( * ) Notice: Subject to any disclaimer, the term of this patent is extended or adjusted under 35 U.S.C. 154(b) by 279 days.

(21) Appl. No.: 14/704,771

(22) Filed: May 5, 2015

(65) Prior Publication Data

US 2016/0153578 A1    Jun. 2, 2016

Related U.S. Application Data

(60) Provisional application No. 62/085,911, filed on Dec. 1, 2014.

(51) Int. Cl.
*F16K 31/06* (2006.01)
*F16K 3/24* (2006.01)
(Continued)

(52) U.S. Cl.
CPC .......... *F16K 31/0696* (2013.01); *F16K 3/246* (2013.01); *F16K 11/044* (2013.01);
(Continued)

(58) Field of Classification Search
CPC .... F16K 31/0696; F16K 3/246; F16K 11/044; F16K 31/1221; F16K 47/023;
(Continued)

(56) References Cited

U.S. PATENT DOCUMENTS 3,106,938 A * 10/1963 Gordon .................. B62D 5/087
                                                                137/596.12
4,741,364 A *  5/1988 Stoss .................... F15B 13/0402
                                                                137/625.6

(Continued)

FOREIGN PATENT DOCUMENTS

DE            1234115 B  *  2/1967   .......... F15B 13/0402

OTHER PUBLICATIONS

Translation of DE1234115B.*

*Primary Examiner* — Kevin F Murphy
*Assistant Examiner* — Kelsey E Cary
(74) *Attorney, Agent, or Firm* — Conley Rose, P.C.

(57) ABSTRACT

The disclosure provides devices and methods for controlling the actuation rates of SPM valves by bi-directionally controlling the fluid which actuates the valve or by maintaining enclosed volumes which communicate with each other through predetermined restrictions as the valve actuates. These enclosed volumes can be completely isolated, depth compensated, share fluid with the pilot actuating fluid, or utilize the main system fluid. The restrictions can be modified to increase or decrease the actuation rates of the SPM valve. The disclosure also provides control over the main system fluid passage opening and closing positions as well as how rapidly the flow passage areas increase or decrease while opening or closing the valve.

19 Claims, 28 Drawing Sheets

(51) Int. Cl.
*F16K 31/122* (2006.01)
*F16K 47/02* (2006.01)
*F16K 11/044* (2006.01)

(52) U.S. Cl.
CPC ........ *F16K 31/1221* (2013.01); *F16K 47/023* (2013.01); *Y10T 137/86582* (2015.04)

(58) Field of Classification Search
CPC ..... Y10T 137/86582; Y10T 137/86702; Y10T 137/8671
USPC ............................ 137/625.6, 625.68, 625.69
See application file for complete search history.

(56) References Cited

U.S. PATENT DOCUMENTS

| | | | | | |
|---|---|---|---|---|---|
| 4,887,643 | A | * | 12/1989 | Tomlin | ................ E21B 33/0355 137/236.1 |
| 5,771,931 | A | * | 6/1998 | Watson | ............... E21B 33/0355 137/236.1 |

* cited by examiner

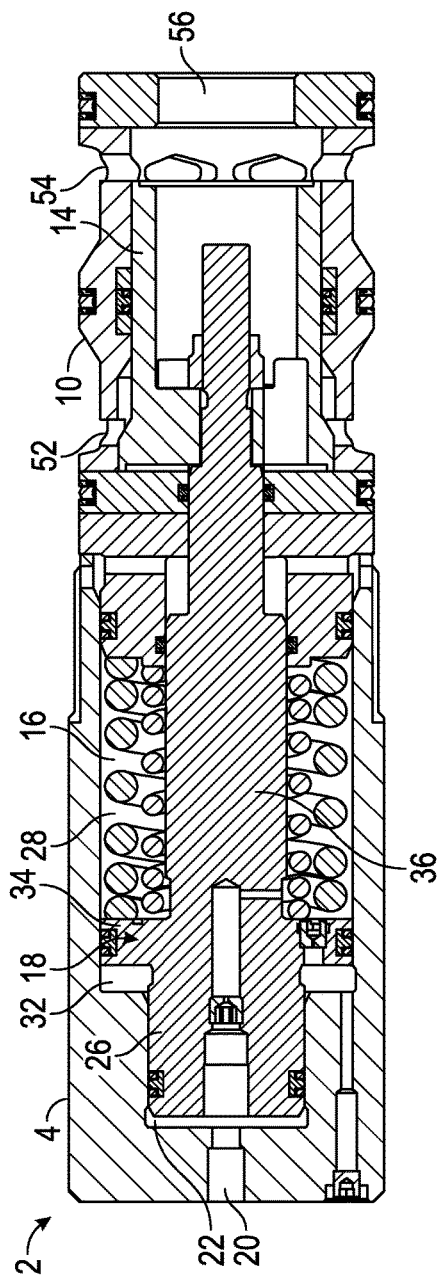
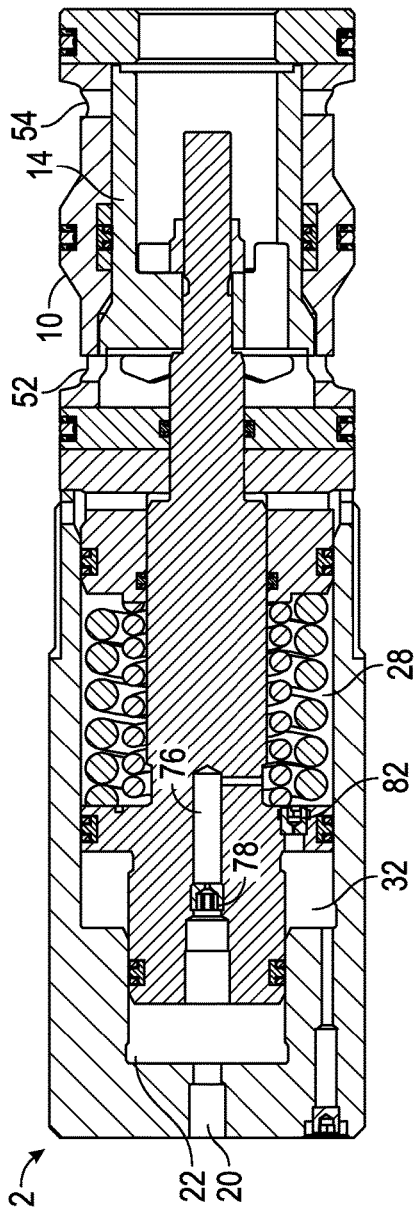
FIG. 2A
FIG. 2B

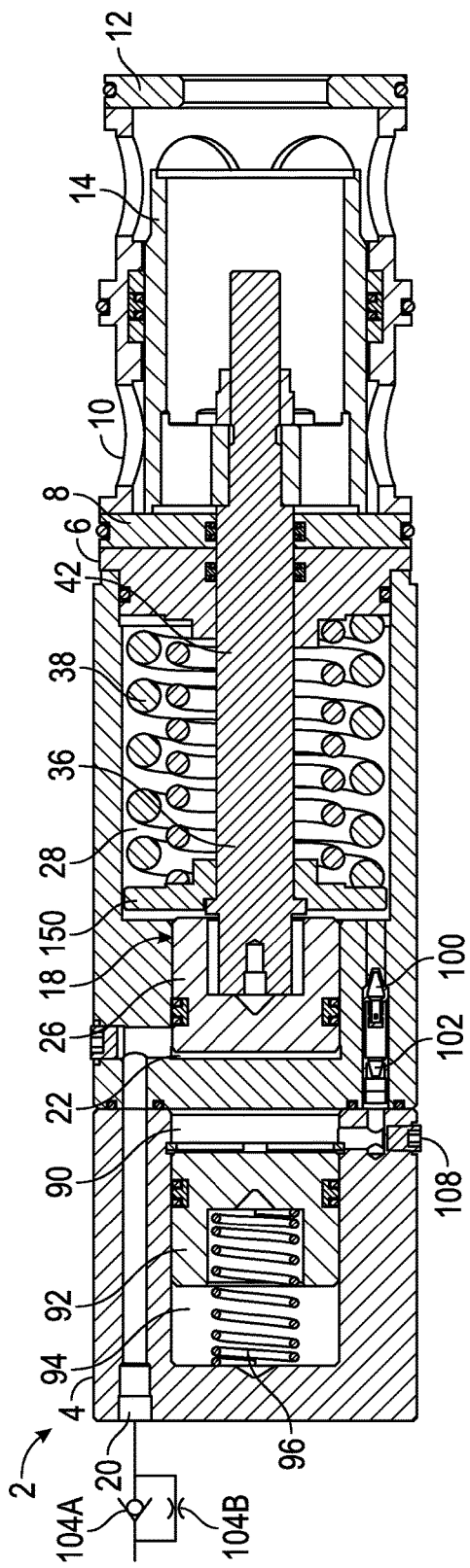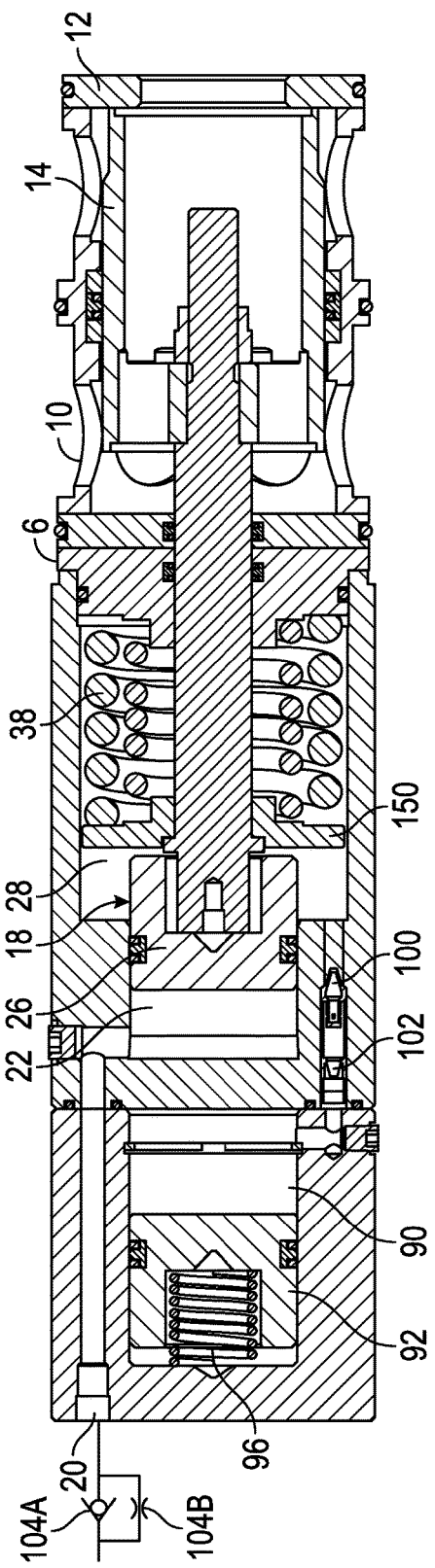
FIG. 3A
FIG. 3B

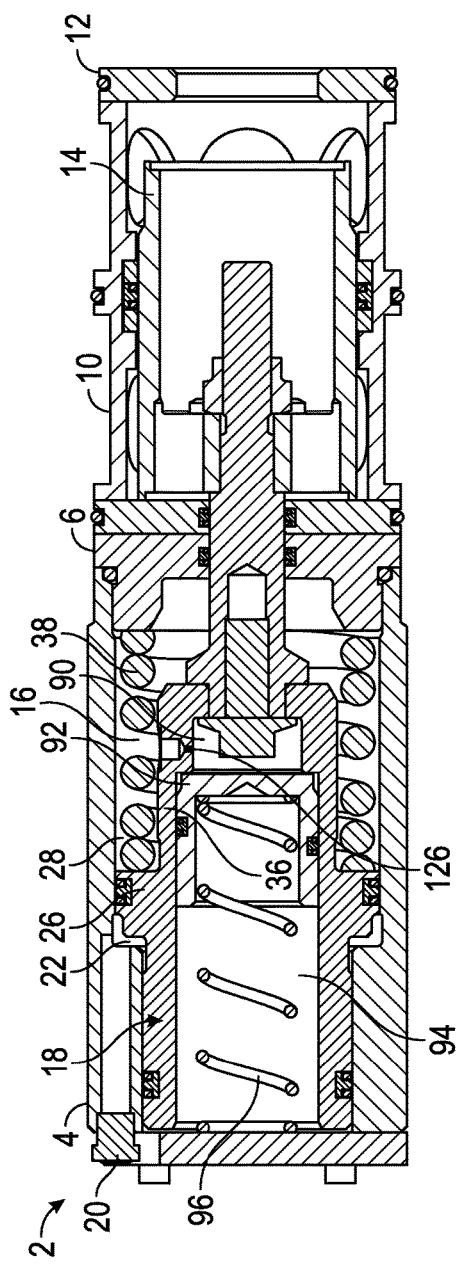
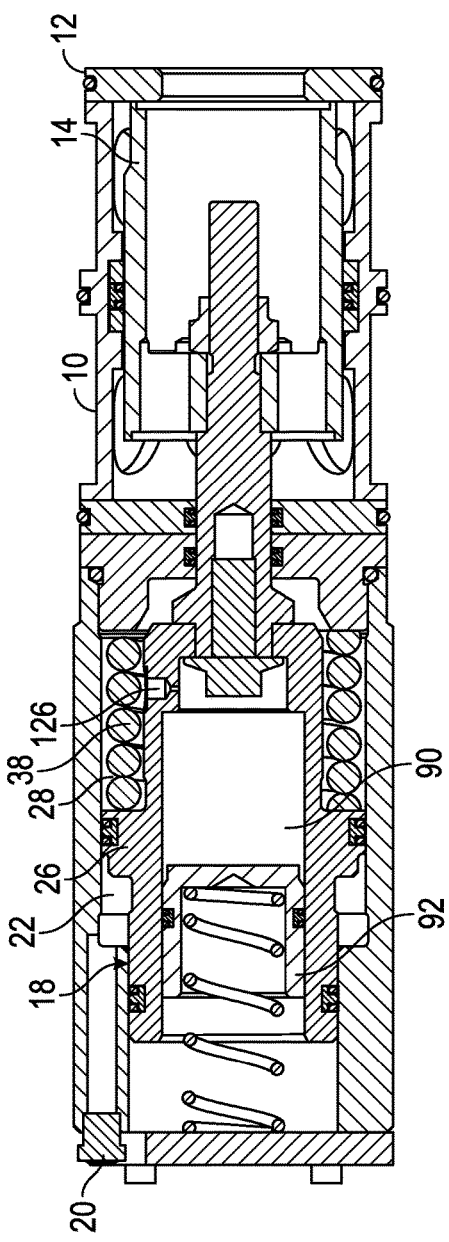
FIG. 4A
FIG. 4B

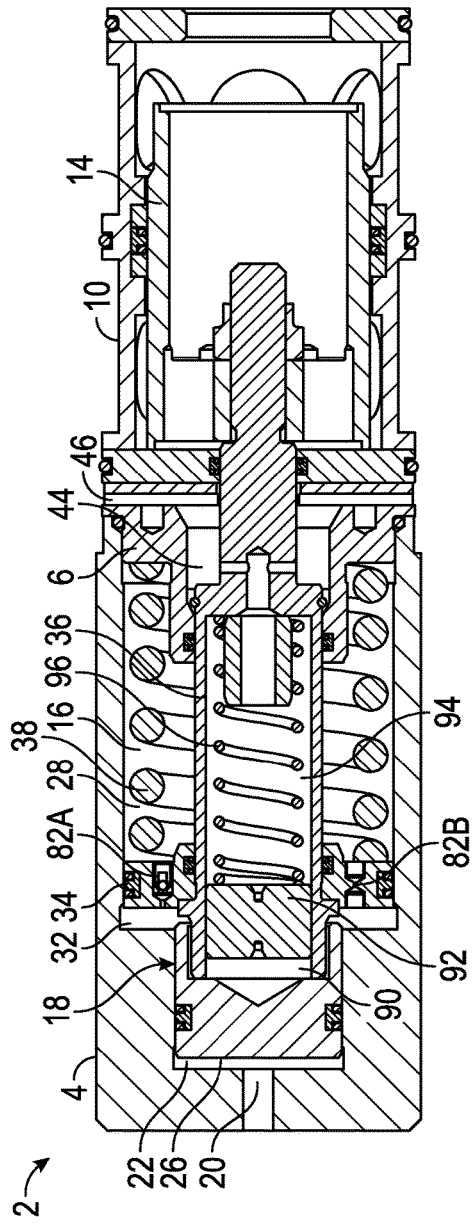
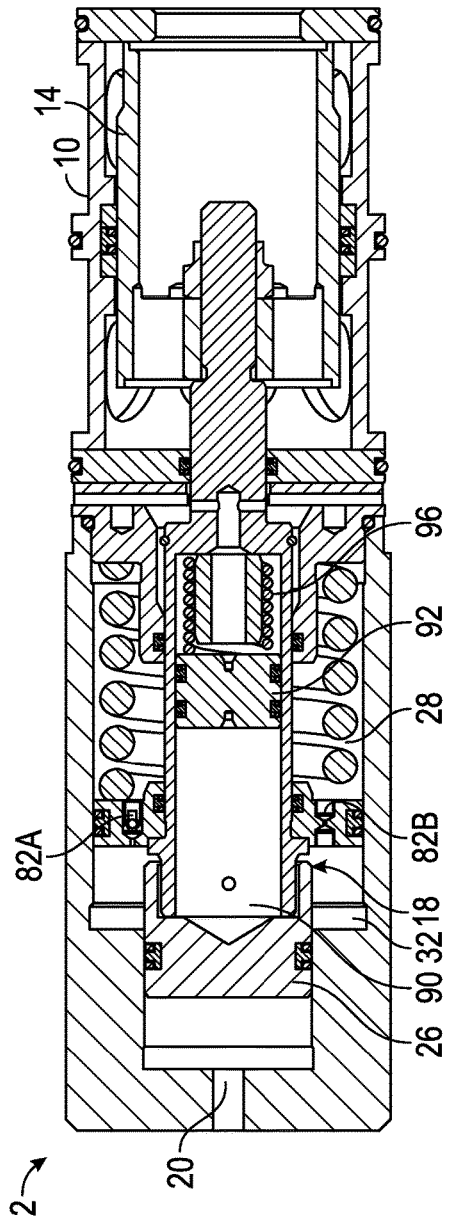
FIG. 5A
FIG. 5B

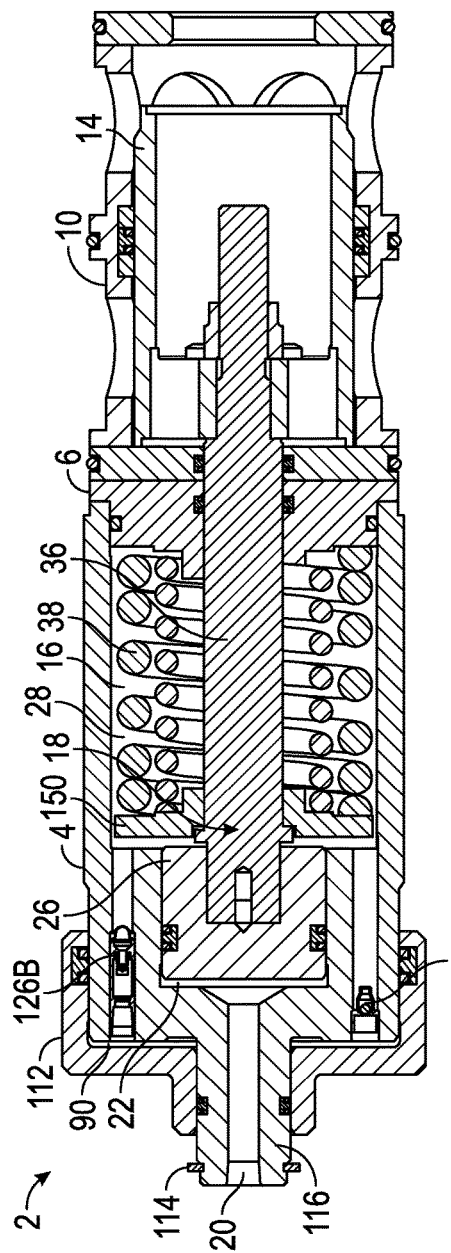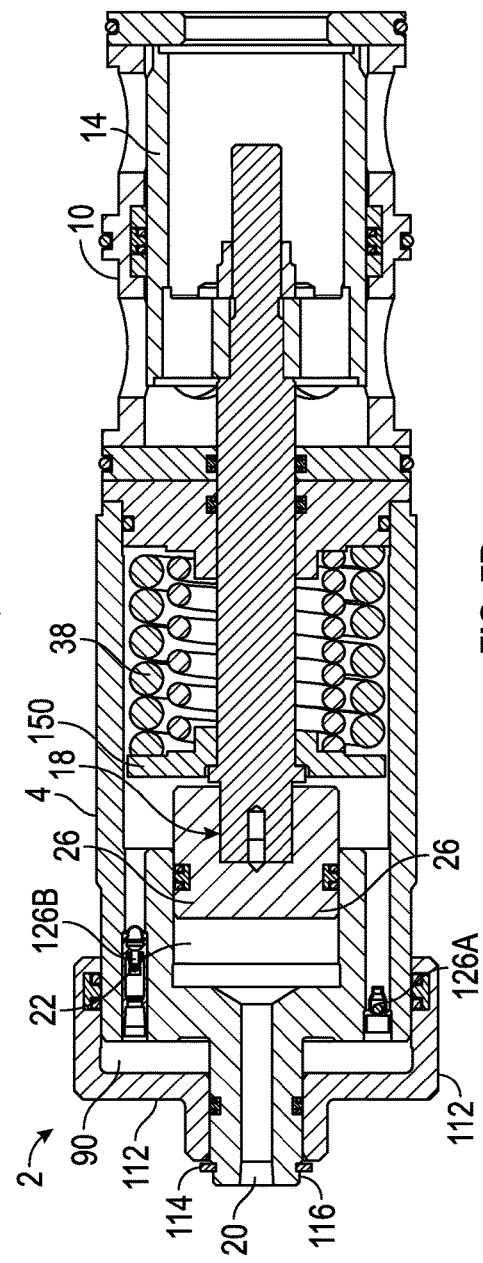
FIG. 7A
FIG. 7B

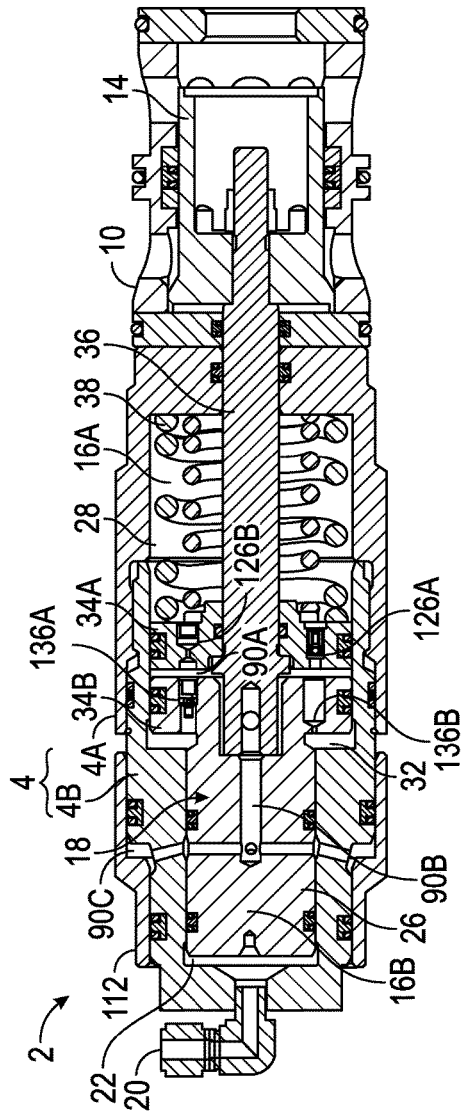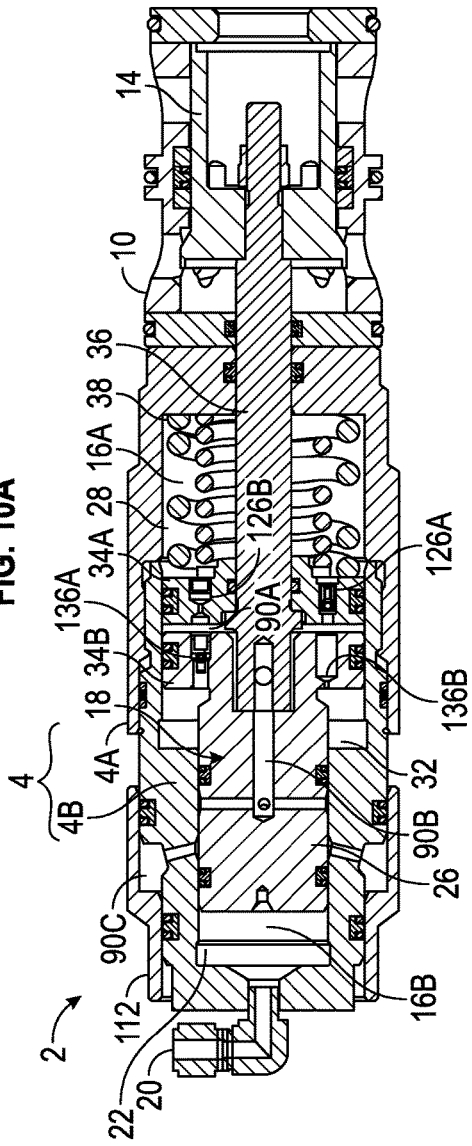
FIG. 10A
FIG. 10B

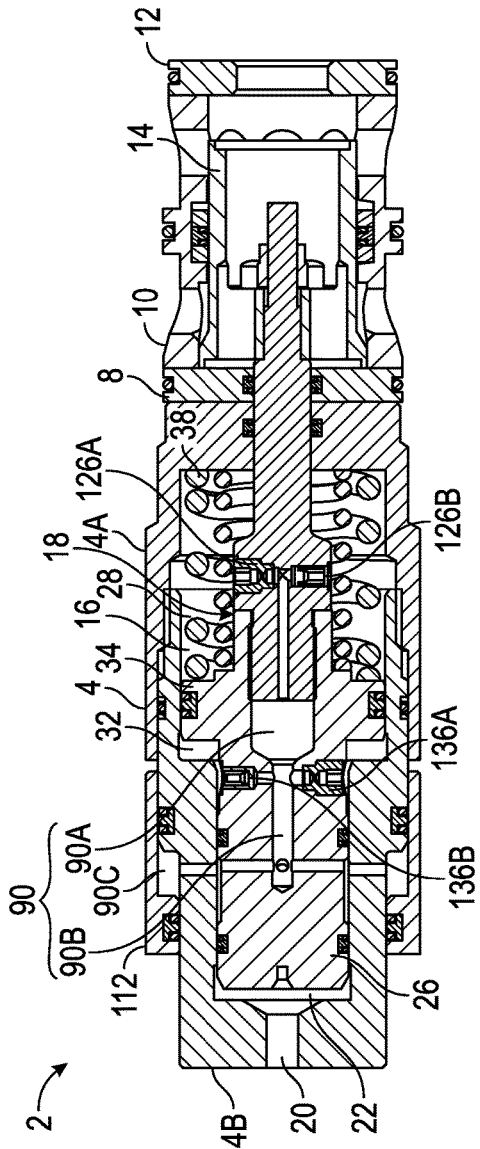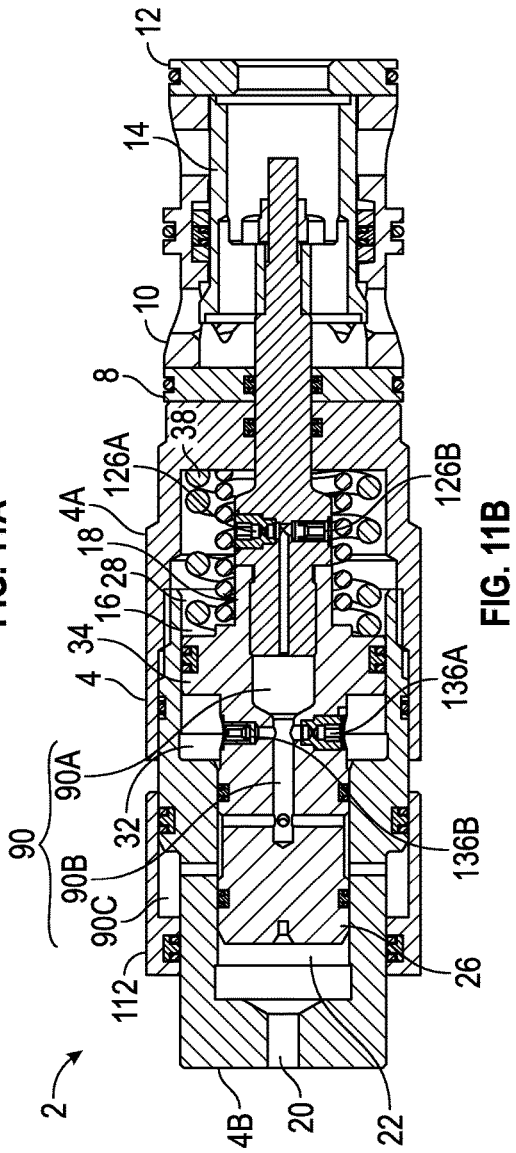

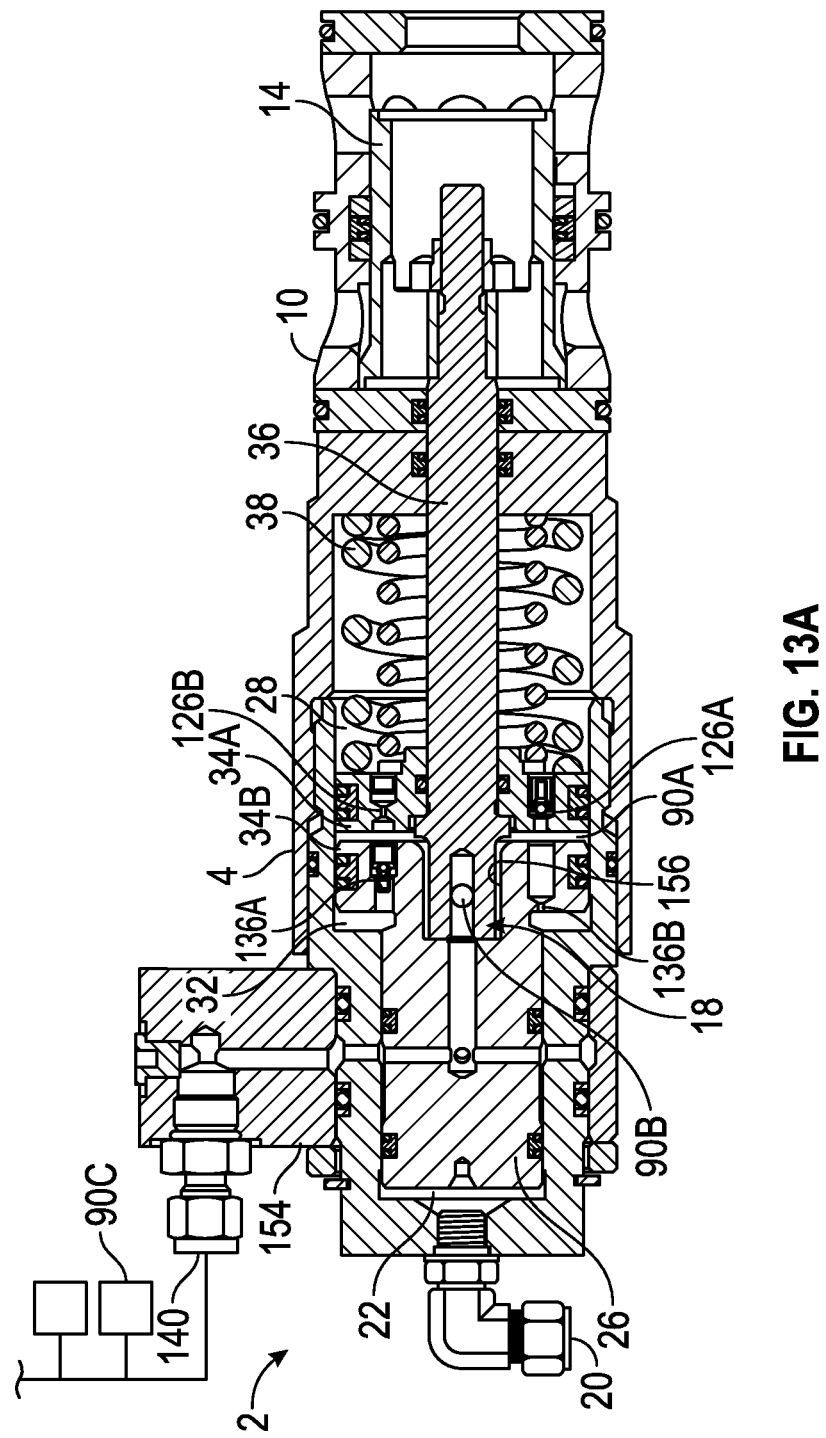

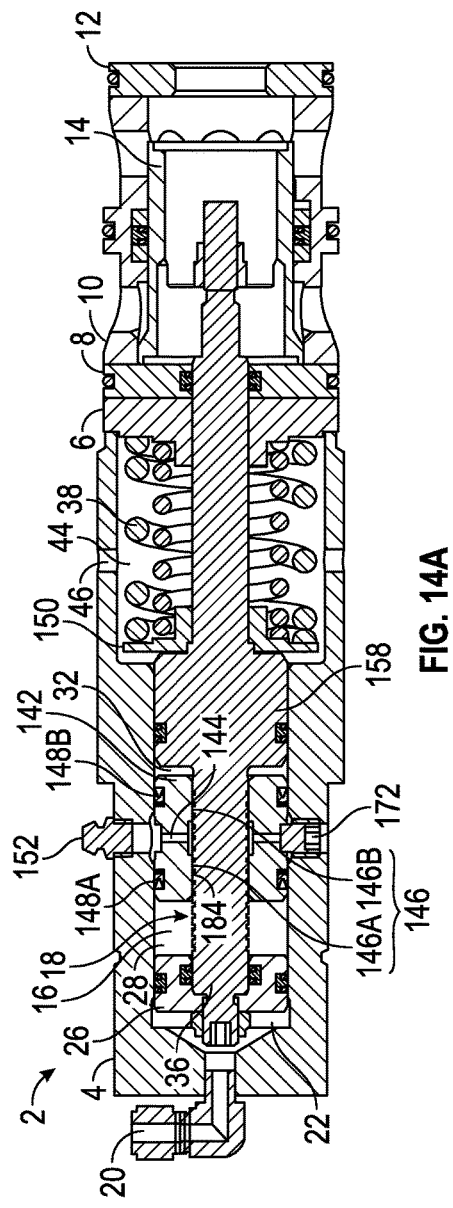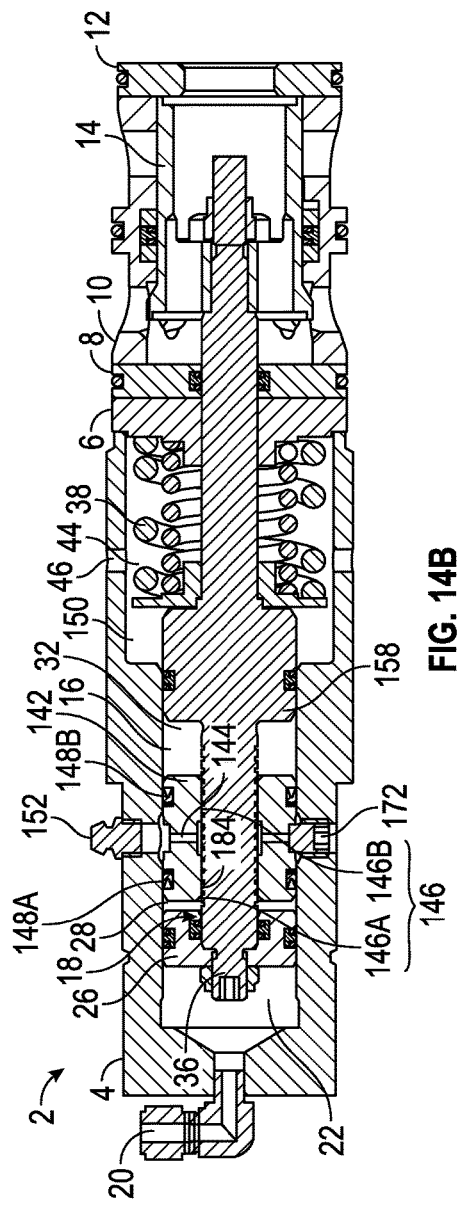

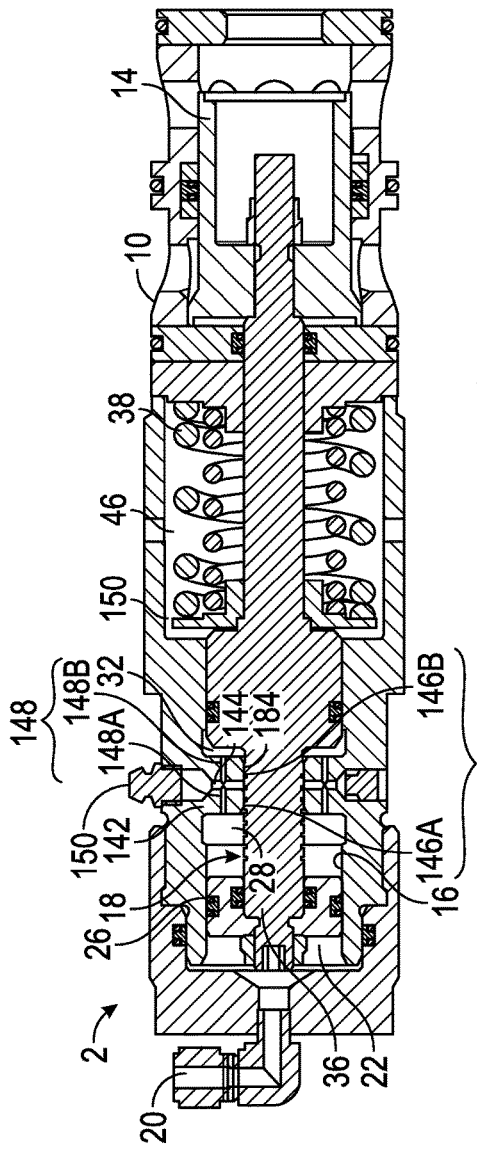
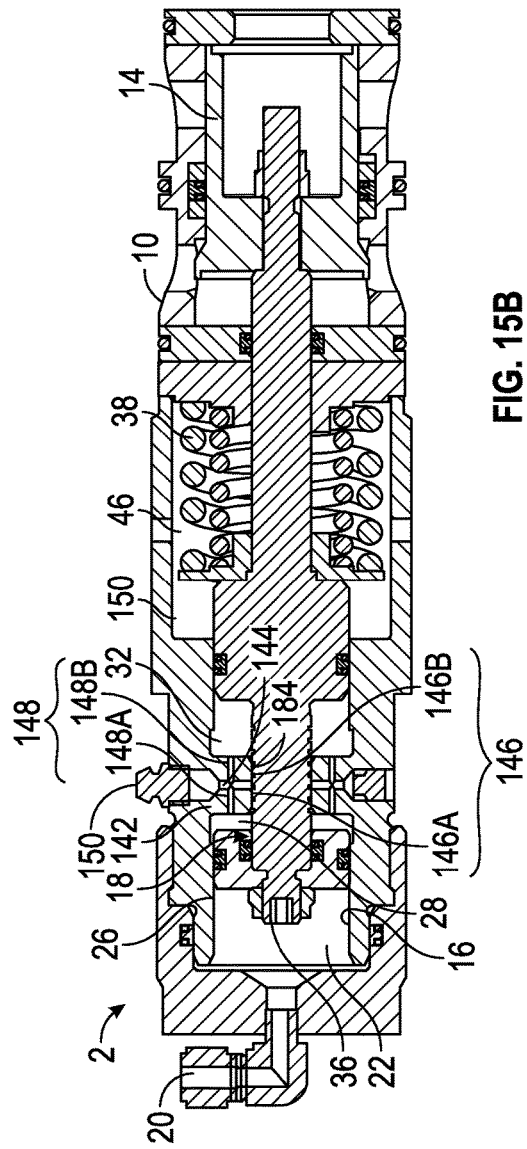
FIG. 15A
FIG. 15B

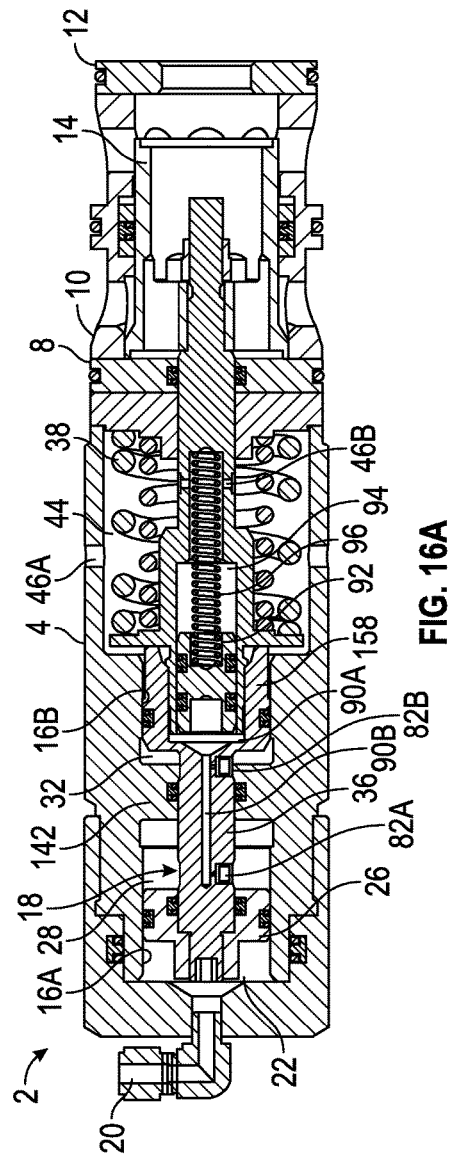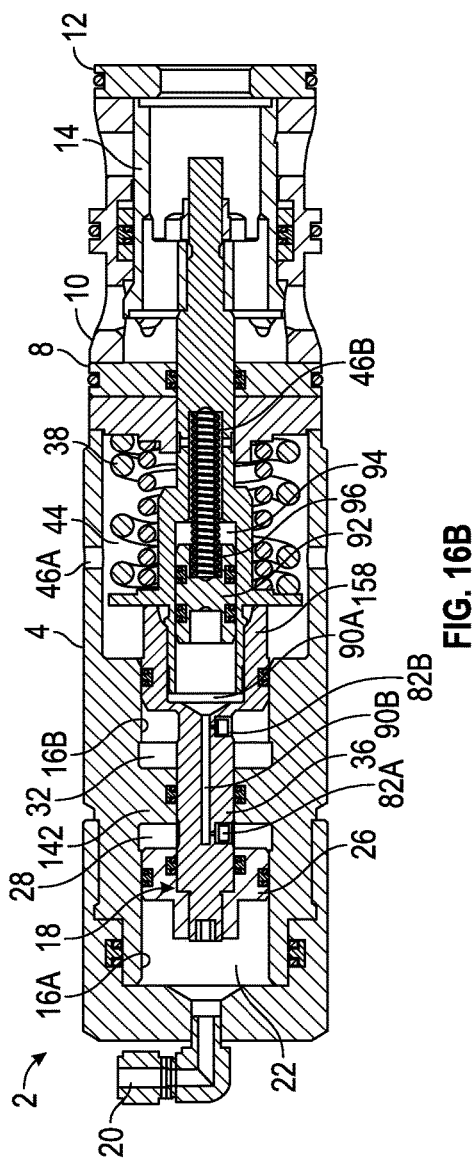
FIG. 16A
FIG. 16B

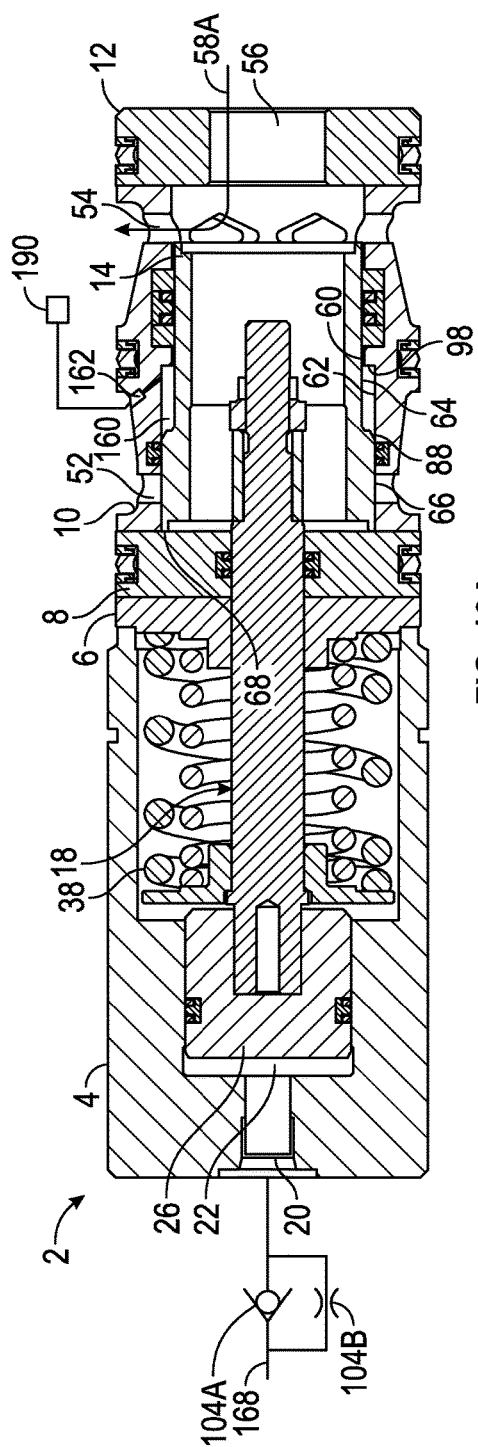
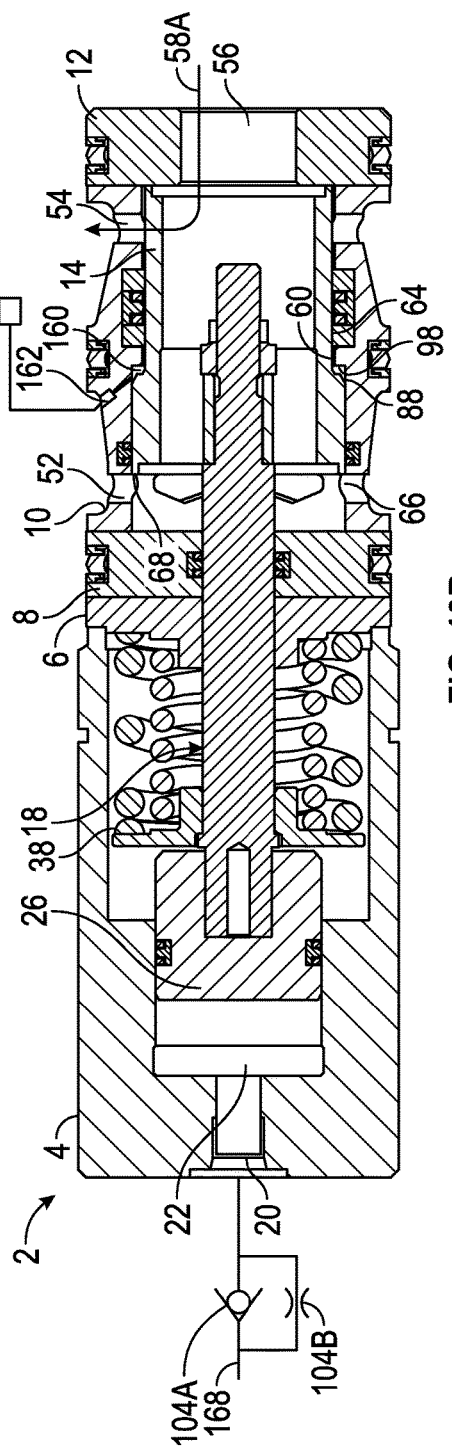
FIG. 19A
FIG. 19B

SLOW-SHIFT SPM VALVE

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to the valves. Specifically, the disclosure relates to the internally controlled speed of shifting of sub-plate mounted (SPM) valves.

Description of the Related Art

Sub-plate mounted (SPM) valves are used to control the direction of high pressure system fluid which in turn performs numerous functions on oil field equipment, such as in a lower marine riser package and a blowout preventer stack on an oil well. Current SPM valves are subject to high pressure differentials and flow rates which result in rapid, uncontrolled valve actuation rates. Typical SPM valves also have very rapid increases in flow areas and poor timing between the supply port and return port, which wastes fluid while the valve is shifting. This poor timing and high rate of actuation creates a fluid phenomenon known as "water-hammer," which is a very high damaging pressure spike. This phenomenon can physically damage structures, operating equipment, hardware, valves, tubing and piping.

Valve timing and spool actuation speed control have been used previously for other applications such as directional control spool valves in off-highway equipment and machinery control. Usually the timing and actuation speed are used to control an external load at the end of a linkage or transmission clutch engagements. The actuation speeds are usually controlled using proportional solenoid valves and software control. Current sub-plate mounted (SPM) valves do not have any, or at least sufficient, bi-directional control of their actuation rates and fluid metering characteristics.

Increasing the shifting time of the SPM valve and controlling the area openings and timing will greatly reduce or eliminate the "water-hammer" effect and improve the efficiency of the fluid being supplied as well as make the overall system more robust and reliable. There remains then a need to provide a better system and method for controlling the shifting of valves.

BRIEF SUMMARY OF THE INVENTION

The disclosure provides devices and methods for controlling the actuation rates of SPM valves by bi-directionally controlling the fluid which actuates the valve or by maintaining enclosed volumes which communicate with each other thru predetermined restrictions as the valve actuates. These enclosed volumes can be completely isolated, depth compensated, share fluid with the pilot actuating fluid, or utilize the main system fluid. The restrictions can be modified to increase or decrease the actuation rates of the SPM valve. The disclosure also provides control over the main system fluid passage opening and closing positions as well as how rapidly the flow passage areas increase or decrease while opening or closing the valve.

The disclosure provides a subplate mounted (SPM) valve comprising: a valve body having pilot port; a piston configured to be actuated by fluid from the pilot port; a valve chamber; a first control chamber formed in the body; a first flow restrictor fluidically disposed between the valve chamber and the first control chamber configured to restrict flow in at least one direction between the valve chamber and the first control chamber; a cage coupled to the body and having a supply port, a return port, and a work port; and a spool slidably engaged with the cage and configured to selectively restrict flow between the supply port and the return port by actuation of the piston.

The disclosure also provides a subplate mounted (SPM) valve comprising: a valve body configured to be coupled to a supply of fluid; a pilot port in the body; a pilot chamber in the body and fluidicly coupled to the pilot port; a piston configured to be actuated by fluid in the pilot chamber from the pilot port; a cage coupled to the body and having a supply port, a return port, and a work port; and a spool slidably engaged with the cage and configured to selectively restrict flow between the supply port and the return port by actuation of the piston. a spool chamber formed between the cage and the spool and fluidicly coupled with the supply of fluid independently from the pilot port; and a first flow restrictor fluidicly disposed between the spool chamber and the supply of fluid.

The disclosure further provides a subplate mounted (SPM) valve comprising: a valve body; a first pilot port in the body; a first flow restrictor coupled in a parallel flow path with a second flow restrictor and both flow restrictors being fluidicly coupled with the first pilot port with at least one of the flow restrictors configured to restrict flow in a first direction and the second flow restrictor configured to restrict flow in an opposite direction; a second pilot port in the body; a third flow restrictor coupled in a parallel flow path with a fourth flow restrictor and both flow restrictors being fluidicly coupled with the second pilot port with at least one of the flow restrictors configured to restrict flow in a first direction and the second flow restrictor configured to restrict flow in an opposite direction; a pilot chamber in the body; a piston fluidicly coupled on a first side to the first pilot port and fluidicly coupled on a second side to the second pilot port; a cage coupled to the body and having a supply port, a return port, and a work port; and a spool slidably engaged with the cage.

The disclosure provides a subplate mounted (SPM) valve comprising: a valve body having pilot port; a piston configured to be actuated by fluid from the pilot port; a valve chamber; a cage coupled to the body and having a supply port, a return port, and a work port; and a spool slidably engaged with the cage and configured to selectively restrict flow between the supply port and the return port by actuation of the piston during a valve stroke, the spool being sized to overlap both the supply port and the return port at the same time during a portion of the valve stroke.

BRIEF DESCRIPTION OF THE SEVERAL VIEWS OF THE DRAWINGS

FIG. 2A is a cross-sectional schematic view of another embodiment of the valve according to the teachings herein, shown in a rest position.

FIG. 2B is a cross-sectional schematic view of a valve in FIG. 2A in an actuated position.

FIG. 3A is a cross-sectional schematic view of another embodiment of the valve according to the teachings herein, shown in a rest position.

FIG. 3B is a cross-sectional schematic view of a valve in FIG. 3A in an actuated position.

FIG. 4A is a cross-sectional schematic view of another embodiment of the valve according to the teachings herein, shown in a rest position.

FIG. 4B is a cross-sectional schematic view of a valve in FIG. 4A in an actuated position.

FIG. 5A is a cross-sectional schematic view of another embodiment of a valve according to the present invention shown in a rest position.

FIG. 5B is a cross-sectional schematic view of the valve in FIG. 5A in an actuated position.

FIG. 7A is a cross-sectional schematic view of another embodiment of the valve according to the teachings herein, shown in a rest position.

FIG. 7B is a cross-sectional schematic view of a valve in FIG. 7A in an actuated position.

FIG. 10A is a cross-sectional schematic view of another embodiment of the valve according to the teachings herein, shown in a rest position.

FIG. 10B is a cross-sectional schematic view of a valve in FIG. 10A in an actuated position.

FIG. 11A is a cross-sectional schematic view of another embodiment of the valve according to the teachings herein, shown in a rest position.

FIG. 11B is a cross-sectional schematic view of a valve in FIG. 11A in an actuated position.

FIG. 13A is a cross-sectional schematic view of another embodiment of the valve according to the teachings herein, shown in a rest position.

FIG. 14A is a cross-sectional schematic view of another embodiment of the valve according to the teachings herein, shown in a rest position.

FIG. 14B is a cross-sectional schematic view of a valve in FIG. 14A in an actuated position.

FIG. 15A is a cross-sectional schematic view of another embodiment of the valve according to the teachings herein, shown in a rest position.

FIG. 15B is a cross-sectional schematic view of a valve in FIG. 15A in an actuated position.

FIG. 16A is a cross-sectional schematic view of another embodiment of the valve according to the teachings herein, shown in a rest position.

FIG. 16B is a cross-sectional schematic view of a valve in FIG. 16A in an actuated position.

FIG. 19A is a cross-sectional schematic view of a valve using the teachings of the present invention for a normally closed valve in a rest position.

FIG. 19B is a cross-sectional schematic view of a valve in FIG. 19A in an actuated position.

DETAILED DESCRIPTION

Figure 1A:
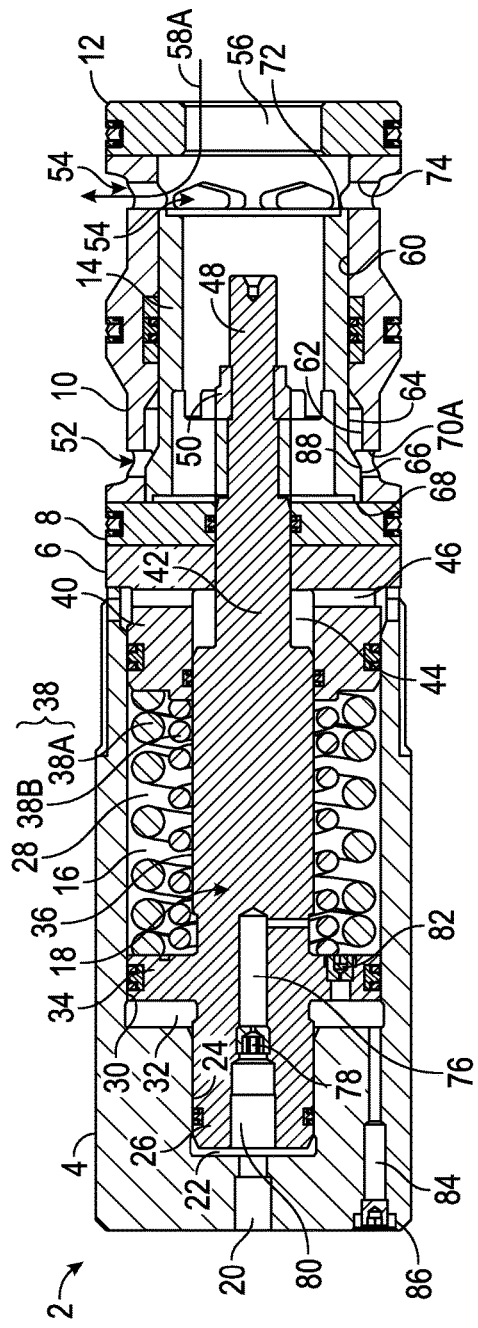
FIG. 1A is a cross-sectional schematic view of an exemplary valve according to the present invention in a retracted rest position.

The Figures described above and the written description of specific structures and functions below are not presented to limit the scope of what Applicant has invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. Where appropriate, one or more elements may have been labeled with an "A" or "B" to designate various members of a given class of an element. When referring generally to such elements, the number without the letter can be used. Further, such designations do not limit the number of members that can be used for that function. Due to the number of embodiments, various descriptions are given for the components and operation. It is expressly understood that descriptions for an embodiment can apply to another embodiment and are not restricted to just the embodiment that is presently being described and thus do not add intermediate generalizations.

Further, various parts are illustrated as separate parts but move together as a unit, and therefore depending on manufacturing capabilities, expense, and other factors can be made as individual parts or as unitary combined parts. For example, in at least some embodiments, a pilot piston, chamber control rod, and retainer plate (described below) can be made as individual parts and assembled together or can be made as one or more unitary combined parts, such as a piston/chamber control rod subassembly, a chamber control rod/retainer plate subassembly, a piston/chamber control rod/retainer plate subassembly, and so forth.

The disclosure provides devices and methods for controlling the actuation rates of SPM valves by bi-directionally controlling the fluid which actuates the valve or by maintaining enclosed volumes which communicate with each other thru predetermined restrictions as the valve actuates. These enclosed volumes can be completely isolated, depth-compensated, share fluid with the pilot actuating fluid, or utilize the main system fluid. The restrictions can be modified to increase or decrease the actuation rates of the SPM valve. The disclosure also provides control over the main system fluid passage opening and closing positions as well as how rapidly the flow passage areas increase or decrease while opening or closing the valve.

The invention shown herein in various embodiments generally involve the use of pilot fluid and individual control chambers connecting to the pilot chamber in a valve. One or more of the chambers are connected using predetermined restrictions. When the valve is commanded to actuate, an actuating rod assembly movement and the restrictions allow the chambers to pressurize but also to slowly pass fluid from one chamber to the next in a manner which controls the actuation speed of a spool in a cage to open and close supply and return ports. The pilot supply pressurizes the back side of the actuating rod assembly. The actuating rod assembly moves the spool from a rest position to an at least partially actuated position while compressing a first control chamber. The compressed fluid from the first control chamber will flow into either a second control chamber or a compensator chamber through one or more flow restrictors. The flow restrictors determine the rate of fluid communication between each chamber and therefore the speed at which the valve can actuate. When the pilot supply is removed from the backside of the actuating rod assembly, a bias element such as a spring or another pressure source forces the actuating rod assembly to move back from the actuated position to the rest position. The fluid in the second control chamber and/or compensator chamber is allowed to flow into the first control chamber generally through one or more flow restrictors for the return stroke. The flow restrictor determine the rate at which the fluid exits the chambers and therefore the speed at which the actuating rod assembly shifts back to a rest position. In some embodiments, the compensator chamber can be preloaded with makeup fluid to provide additional fluid to help keep the first control chamber full of fluid for the next valve actuation. The principles described herein can be applied to a valve, such as a two-way control valve, including a sub-plate mounted (SPM) valve.

Figure 1B:
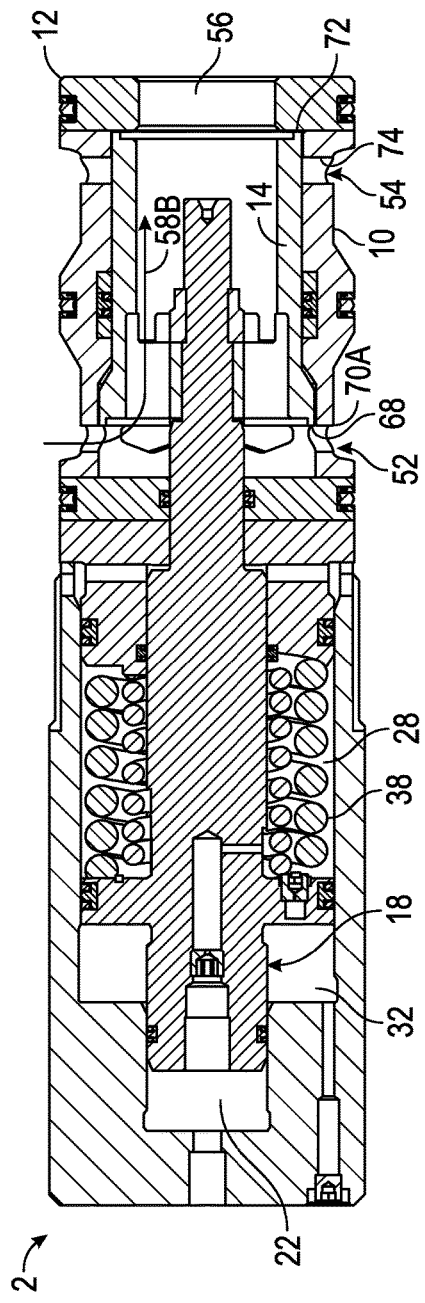
FIG. 1B is a cross-sectional schematic view of the valve in FIG. 1A in an extended actuated position.

FIG. 1A is a cross-sectional schematic view of an exemplary valve according to the present invention in a retracted rest position. FIG. 1B is a cross-sectional schematic view of the valve in FIG. 1A in an extended actuated position. For purposes of illustration, the exemplary valve will be shown herein as a sub-plate mounted (SPM) valve 2 and can be divided into two primary modules coupled together. The first module includes the valve body 4 and its components, and the second module includes a ported cage 10 having a spool 14 slidably disposed therein. The valve body 4 and its components actuate the spool 14 within the cage 10 from a retracted rest position to a fully actuated position, as shown by the differences between FIG. 1A and FIG. 1B. A seal plate 8 is disposed between the valve body 4 and the cage 10 to form a sealing surface for the spool 14 in a rest position. A backup plate 6 provides structural rigidity for the seal plate 8 and is mounted between the valve body 4 and the seal plate 8 distally of the cage relative to the seal plate 8. A second seal plate 12 is mounted distal from the first seal plate 8 relative to the spool 14, so that the spool can seal against the plate 12 in a fully actuated position.

The valve body 4 includes a valve cavity 16 formed therein into which components of the valve can be disposed. One component of the valve is an actuating rod assembly 18, described in more detail below. A pilot port 20 can be disposed at any suitable location in the valve to provide actuating pressure to the pilot chamber 22 having a pilot chamber diameter 24. A pilot piston 26, as part of the actuating rod assembly 18, is in fluidic communication with the pilot fluid from the pilot port 20. The pilot piston 26 forms a movable longitudinal boundary for pilot fluid in the pilot chamber 22. The actuating rod assembly 18 further includes a dividing retainer plate 34 that is distal from the pilot port 20, relative to the pilot piston 26. The dividing retainer plate can support one or more bias elements 38A and 38B (collectively 38), such as one or more coiled springs.

Further, the dividing retainer plate 34 can include peripheral seals that engage the wall of the valve cavity 16 to form a first control chamber 28 in which the bias elements can be disposed and a second control chamber 32 on the distal side of the dividing retainer plate from the first control chamber. The pilot chamber 22, the second control chamber 32, and a compensator chamber 90 described below, can be referenced herein as a valve chamber to differentiate from the first control chamber. A diameter 30 of the first control chamber 28 is larger in several embodiments than the pilot chamber diameter 24. The actuating rod assembly 18A further includes a control chamber rod 36 having a smaller diameter than the dividing retainer plate 34. The control chamber rod 36 can have a reduced diameter 42 that slidably engages an opening in the backup plate 6 and the seal plate 8 and can further include a shoulder onto which the spool 14 can be mounted. The spool 14 can be coupled to a rod end 48 of the actuating rod assembly 18 with a fastener 50. In the embodiment shown, the control chamber rod 36 used in the first control chamber 28 can have the same diameter as the diameter of the pilot piston 26, although in other embodiments the diameters can be different. A chamber 44 can be formed with the different diameters of the control chamber rod. The chamber 44 can be an ambient pressure chamber by fluidicly coupling the chamber with an ambient pressure port 46 that extends to an outside ambient pressure to allow the valve to self-compensate for different operating ambient pressures.

The first control chamber 28 can be fluidicly coupled with the pilot chamber 22 in a flow restricted manner. A flow path 76 can be formed through associated porting between the first control chamber 28 and the pilot chamber 22 with a flow restrictor 78 disposed therebetween. Fluid can flow through the flow restrictor 78 in a restricted manner to control the speed of the valve during movement of the actuating rod assembly 18 in a first direction that actuates the valve by providing pilot pressure through the pilot port 20 into the pilot chamber 22 to move the pilot piston 26 and shift the spool 14 in the cage 10 from a rest position shown in FIG. 1A to an actuated position shown in FIG. 1B. Further, fluid can flow from the first control chamber 28 into the second control chamber 32 through a flow restrictor 82, and thus the flow restrictor 82 can also exert control on the speed of the valve actuation. Likewise, the flow restrictor 82 can allow fluid to flow from the first control chamber 28 into the second control chamber 32 in a restricted manner to control the speed of the valve.

A return stroke can occur by releasing the pilot pressure, which allows the bias element 38 to exert force on the dividing retainer plate 34 and return to the spool and actuating rod assembly from the actuated position in FIG. 1B to the rest position in FIG. 1A. However, the speed of the return stroke can be controlled by the flow restrictor 82 allowing restricted flow of fluid from the second control chamber 32 into the first control chamber 28. Fluid can also flow into the chamber 28 from the pilot chamber 22 through the flow restrictor 78 in a restricted manner.

Thus, the flow restrictors 78 and 82 or a combination thereof can be used to control the speed of the valve shifting. The term "flow restrictor" is used broadly herein and includes, for example, an orifice, a check valve, a flow controller, or other restriction. Some flow restrictors, such as a check valve or a flow controller can be uni-directional, and some flow restrictors, such as an orifice, can be bi-directional to flow therethrough. Further, a flow restrictor can further include a one-way seal, narrow passages, and an annular space between adjacent members to purposefully allow flow in a restricted manner. In some embodiments, the restricted flow may be sealed from occurring in certain operating regimes.

An air bleed port 84 can be provided to initially set up the valve and a flow restrictor 86, such as in a plug, can be coupled to the air bleed port 84 to seal the air bleed port after air has been discharged from the valve.

The cage 10 includes a supply port 52 formed through one portion of the cage with a return port 54 formed through the cage distally from the supply port 52. A work port 56 can be formed in another portion of the cage 10 that can fluidicly communication with both the supply port 52 and the return port 54 at different stages of the spool shifting. In at least one embodiment, the cage has a first inside diameter 60 and second inside diameter 62 that is larger than the diameter 60 and thereby forms a step in the inner periphery of the cage. The spool 14 has a corresponding first outside diameter 64 and a second outside diameter 66 that is larger than the diameter 64. The change in the spool diameters forms an enlarged portion of the spool that can seal across the port 52 in the first position and then slide into the step formed between the diameters of the cage when the spool is shifted to a second position. The spool includes a first end 68 that can seal against the seal plate 8 in the rest first position and a second end 72 that can seal against the seal plate 12 in an actuated second position.

In the illustrated position of the spool shown in FIG. 1A, the port 52 is closed and the port 54 is open to the work port 56, allowing a flow path 58A between the port 56 and the port 54. However, in FIG. 1B, the spool is shifted to the right in the illustration, so that the port 52 is open to the port 56 and the port 54 is closed, allowing a flow path 58B between the port 52 and the port 56. In the second position when the valve has been fully actuated, the first end 68 of the spool can be aligned with the port edge 70A of the cage 10 in a fully open position.

FIG. 2A is a cross-sectional schematic view of another embodiment of the valve according to the teachings herein, shown in a rest position. FIG. 2B is a cross-sectional schematic view of a valve in FIG. 2B in an extended position. The embodiment shown in FIG. 2A and in FIG. 2B represents a variation from FIGS. 1A and 1B. Similar elements will be provided with similar numbers as described in FIGS. 1A and 1B in this and other figures herein. The valve body 4 is coupled with the cage 10 and spool 14 where the cage includes the ports 52, 54, and 56. The pilot 20 is fluidicly coupled with the pilot chamber 22. The actuated rod assembly 18 includes a pilot piston 26 and a dividing retainer plate 34 that divides the valve cavity 16 into a first control chamber 28 and a second control chamber 32. The control chamber rod 36 of the actuating rod assembly 18 however has a smaller diameter relative to the pilot piston 26. The smaller diameter of the control chamber rod 36 causes an excessive amount of fluid in chamber 28 as the pilot piston 26 enters the cavity 16 which forces the fluid through the flow restrictor 82 into the second chamber 32 and through the flow restrictor 78 into the pilot chamber 22. On the return stroke, fluid in the chamber 32 can flow back into the chamber 28 through the flow restrictor 82 to refresh the amount of fluid in the chamber 28 but not the flow restrictor 78 is the flow restrictor 78 is a check valve for example.

Generally, the embodiments shown in FIGS. 3A thru 7B involve the use of pilot fluid, at least one separate enclosed control chamber, and a compensating chamber to control the actuation rate of the SPM valve. When the pilot supply port is pressurized, the actuating rod assembly moves downward and pressurizes the separate control chamber. The fluid in the enclosed control chamber is allowed to flow into the compensation chamber thru a restriction which controls the rate of fluid flow and therefore the rate at which the valve shifts. The compensation chamber allows the enclosed chamber fluid to not be effected by sea water depths which would affect the operation of the valve. A flow restrictor in the form or a unidirectional, free-flow check valve can be installed between the compensation chamber and at least one of the control chambers to allow such chamber to easily refill as the actuating rod assembly moves back to a rest position. In some embodiments, when the pilot supply fluid is turned off and the actuating rod assembly is allowed to shift back to a rest position, a restriction in the pilot port or hydraulic line controls the rate at which the actuating rod assembly moves to the rest position. Also, a flow restrictor as a free-flow check valve can be installed in the pilot supply to by-pass the restriction in the pilot line when the SPM valve is actuating due to pilot pressure.

FIG. 3A is a cross-sectional schematic view of another embodiment of the valve according to the teachings herein, shown in a rest position. FIG. 3B is a cross-sectional schematic view of a valve in FIG. 3A in an actuated position. FIG. 3A illustrates the pilot piston in the rest position caused by the bias element 38 where the spool 14 is sealed against the seal plate 8, while FIG. 3B illustrates the fully actuated position of the valve where the pilot piston has been pushed into the cavity 28 by pilot pressure in the pilot chamber 22 so that the bias element 38 is compressed and the actuating rod assembly 18 has made the spool 14 shift into a position so that the spool contacts the seal plate 12.

In the embodiment shown in these figures, the valve body 4 is similarly coupled to a cage 10 with a spool 14 therein. Pilot fluid can be provided to the pilot port 20 through a flow restrictor 104A having a open orientation in a first direction to supply the fluid on an actuating stroke and a restricted flow that blocks flow in a second direction on a return stroke. A second flow restrictor 104B can restrict flow in the return stroke. The pilot port 20 is coupled to the pilot chamber 22 in which the pilot piston 26 is disposed. The pilot piston 26 is coupled with the control chamber rod 36 and the retainer plate 150 that forms the actuating rod assembly 18. The diameter of the control chamber rod 36 can be smaller than the diameter of the pilot piston 26. The bias element 38 is disposed in the first control chamber 28 between the backup plate 6 and the retainer plate 150. However, in this embodiment, the dividing retainer plate is not necessarily sealed against the wall of the control chamber 28 and, thus, the fluid in chamber 28 is available on both sides of the retainer plate 150.

A compensator chamber 90 is formed in a cavity 94 of the valve body 4. A compensator piston 92 is engaged with a wall surfaces of the cavity 94 and has a bias element 96 engaged with the compensator piston distal from the compensator chamber 90. Further, the compensator chamber 90 can be prepared with a volume of make-up fluid to refill chamber 28 for an allowable amount of leakage. An opening between the chamber 28 and the chamber 90 establishes a flow path to fluidicly couple the two chambers. The flow path may include a flow restrictor 100, such as a flow controller, and, in some embodiments, a filter 102, such as a screen filter. The flow restrictor 100 can restrict flow from the chamber 28 into chamber 90 on an actuating stroke, and allow a free-flow return when the chamber 90 refills the chamber 28 on the return stroke.

FIG. 4A is a cross-sectional schematic view of another embodiment of the valve according to the teachings herein, shown in a rest position. FIG. 4B is a cross-sectional schematic view of a valve in FIG. 4A in an actuated position. In this embodiment, the pilot chamber 22 is an annular pilot chamber around the actuating rod assembly 18 with a compensating chamber 90 formed in a cavity 94 of the actuating rod assembly. More specifically, the actuating rod assembly 18 is disposed in the valve cavity 16, so that the pilot piston 26 separates the pilot chamber 22 from the first control chamber 28 and thereby, also functions as a dividing retainer plate. The bias element 38 is disposed in the first control chamber 28 and abuts the pilot piston 26 on one end with backup plate 6 on the other end, distal from the pilot piston 26. The actuating rod assembly 18 includes the cavity 94 with a compensator piston 92 disposed therein. The compensator piston 92 is biased toward one end of the cavity 94 with a bias element 96. On a distal side of the cavity 94 relative to the bias element 96 is a chamber forming a compensator chamber 90. The compensator chamber 90 is fluidicly coupled with the first control chamber 28 through a flow restrictor 126. The actuating rod assembly 18 is coupled with the spool 14 inside the cage 10 for shifting the spool to actuate the valve.

In operation, when the valve is deactivated in a rest position, the bias element 38 biases the pilot piston 26 toward the pilot port 20 and reduces the volume of the pilot chamber 22. Further, the bias element 96 biases the compensator piston 92 toward the compensator chamber 90 and reduces the volume in the compensator chamber. Upon actuation with pilot fluid flowing through the pilot port 20, the pilot chamber 22 is filled with fluid which forces the pilot piston 26 to move toward the direction of the cage 10 and compress the volume in the first control chamber 28. The fluid in the first control chamber 28 is restricted from flowing into the compensator chamber 90 by the flow restrictor 126, which controls the speed at which the pilot piston 26 can move within the cavity 16 and therefore the speed of the spool 14 within the cage 10. The compensator chamber 90 can increase in volume as the fluid from the chamber 28 enters through the flow restrictor 126 until the maximum stroke of the valve is reached which may be when the spool 14 engages the seal plate 12 and restricts further movement. In this embodiment, the flow restrictor 126 causes the compensator chamber 90 to function as a second control chamber, such as described above. On the return stroke, the pilot pressure is deactivated, allowing the bias element 38 to expand and return the pilot piston 26 to its rest position toward the pilot port 20. The flow restrictor 126 restricts fluid in the compensator chamber 90 from flowing into the first control chamber 28. The flow restrictor 126 thus controls the return speed as well.

FIG. 5A is a cross-sectional schematic view of another embodiment of a valve according to the present invention shown in a rest position. FIG. 5B is a cross-sectional schematic view of the valve in FIG. 5A in an actuated position. In this embodiment, the first control chamber 28 is fluidicly separated and restricted in flow from the second control chamber, while the second control chamber 32 is not fluidicly restricted from the compensator chamber 90. Thus, the compensator chamber 90 acts as a portion of the second control chamber 32 or, alternatively phrased, the second control chamber 32 acts as a portion of the compensator chamber 90.

The valve body 4 includes the pilot port 20 that is fluidicly coupled to the pilot chamber 22 with the pilot piston 26 disposed therein. The actuating rod assembly 18, which includes the pilot piston 26, is at least partially disposed within the valve cavity 16 of the valve body 4. The actuating rod assembly 18 includes the retainer plate 150 that sealingly engages the walls of the cavity 16 and separates the first control chamber 28 from the second control chamber 32. The bias element 38 is disposed within the first control chamber 28 and abuts the retainer plate 150 on one end and the backup plate 6 on a distal end. A first flow restrictor 126A is disposed in the retainer plate 150. Similarly, a second flow restrictor 126B is disposed in another portion of the retainer plate 150. In an exemplary embodiment, the flow restrictor 126A may include a check valve and an orifice, and the flow restrictor 126B may include an orifice. The flow restrictor 126A with the check valve can be oriented to block flow from the chamber 328 into the chamber 32 on the actuating stroke so that fluid is controlled through the flow restrictor 126B, and therefore the speed of the speed of the actuating stroke that shifts the spool 14 from the position shown in FIG. 5A to the position shown in FIG. 5B. However, the check valve in the flow restrictor 126A can allow flow through its orifice on the return stroke.

The actuating rod assembly 18 includes a cavity 94 formed so that a compensator piston 92 can be disposed therein to form a compensator chamber 90 on one side of the compensator piston 92 that is biased with a bias element 96 on a distal side of the compensator piston. The compensator chamber 90 is fluidicly coupled with the second control chamber 32 by allowing the fluid to flow between an external portion of the control chamber rod 36 that is disposed within the pilot piston 26. Thus, when fluid flows in and out of the compensator chamber 32, the fluid in the compensator chamber 90 is also affected.

To assist the valve operation in various environments, an ambient pressure port 46 is formed in the valve body 4 such as near the backup plate 6 and is fluidicly coupled to an ambient pressure chamber 44. The ambient pressure chamber 44 can be fluidicly coupled with the cavity 94 which contains the bias element 96 for the compensator piston 92. Thus, the ambient pressure chamber 44 can be used to allow the valve to self-adjust to different operating environments.

Figure 6A:
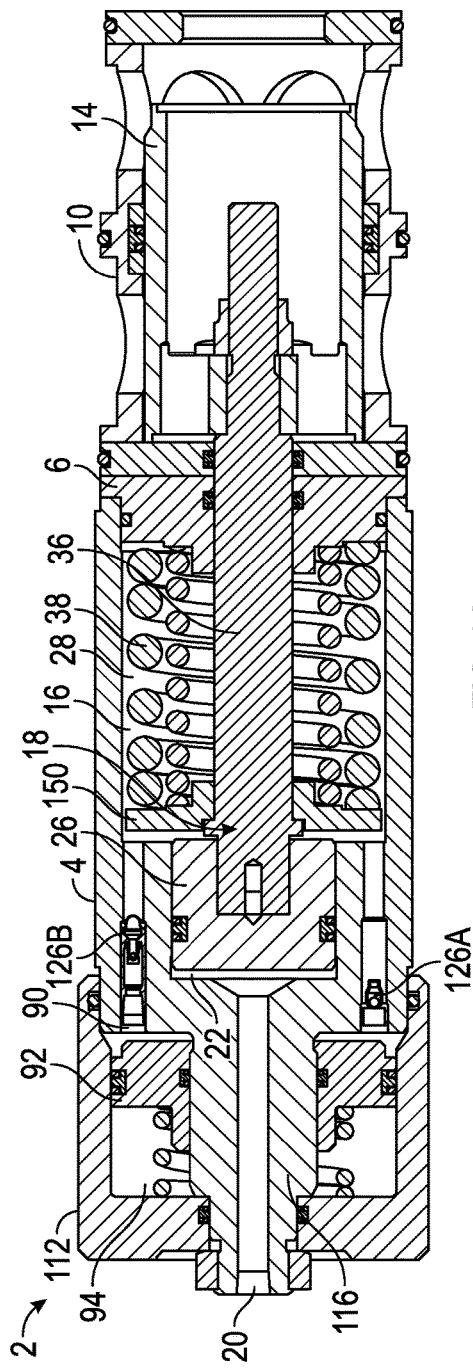
FIG. 6A is a cross-sectional schematic view of another embodiment of the valve according to the teachings herein, shown in a rest position.
Figure 6B:
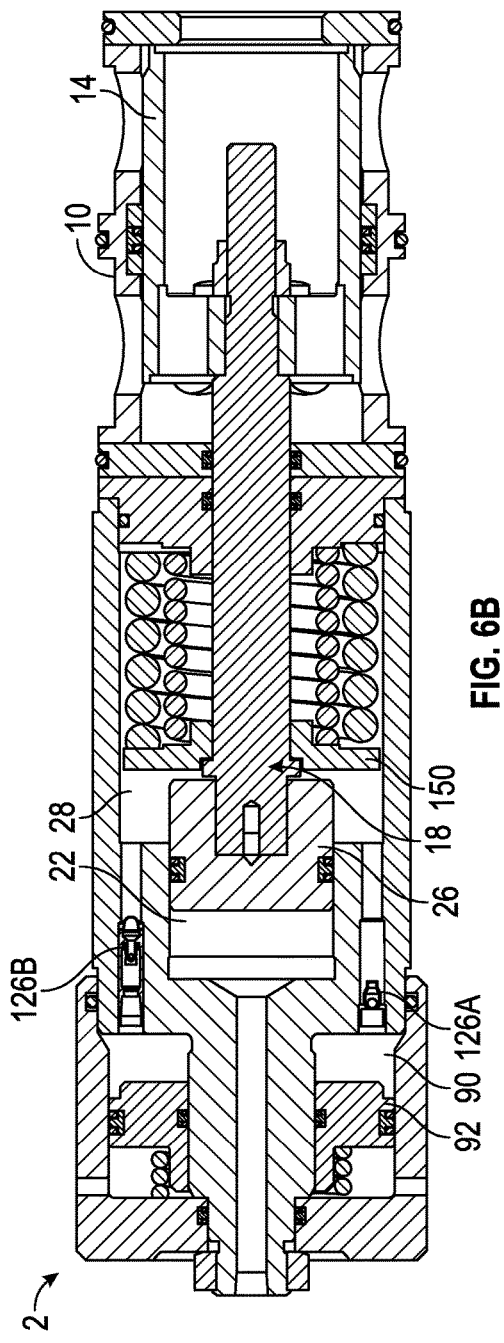
FIG. 6B is a cross-sectional schematic view of the valve in FIG. 6A in an actuated position.

FIG. 6A is a cross-sectional schematic view of another embodiment of the valve according to the teachings herein, shown in a rest position. FIG. 6B is a cross-sectional schematic view of the valve in FIG. 6A in an actuated position. The valve body 4 includes an extended pilot port 20 that is formed through a chamber rod 116. A chamber housing 112 is coupled with the chamber rod 116 to form a cavity 94 therebetween. A compensator piston 92 is disposed in the cavity 94 and slidably and sealingly engaged with the wall of the chamber housing 112 on the outside periphery of the piston 92 and the outer periphery of the chamber rod 116 on the inside periphery of the piston 92. The valve body 4 further includes the cavity 16 with the actuating rod assembly 18 disposed therein, having a pilot piston 26, a retainer plate 150, and a chamber control rod 36. The bias element 38 is disposed between the retainer plate 150 and the backup plate 6, and biases actuating rod assembly 18 so that the pilot port chamber 22 is minimized. The retainer plate 150 is not necessarily sealed against the wall of the cavity 16, so that fluid can pass over the retainer plate to either side of the retainer plate as the plate is moved within the cavity 16. Flow is restricted between chamber 28 and the compensator chamber 90 by a flow restrictor 126A and flow restrictor 126B. In at least one embodiment, the flow restrictor 126A can include a check valve open in the direction from the chamber 90 into the first control chamber 28, so that the flow restrictor blocks flow on the actuating stroke, but is open on the return stroke. The flow restrictor 126B can include a flow controller that restricts fluid from the chamber 28 to flow into the compensator chamber 90 on the actuating stroke, but can be open on the return stroke. Thus, the speed of the actuating rod assembly 18 is controlled on an actuating stroke that moves the spool 14 from its position in FIG. 6A to the position shown in FIG. 6B by restricting flow through the flow restrictor 126B, which flow is blocked through the flow restrictor 126A. After the pilot pressure 20 is released and the bias element 38 is allowed to return the actuating rod assembly 18 to a rest position, fluid can freely flow from the compensator chamber 90 into the chamber 28 through the open flow restrictors 126A and 126B.

FIG. 7A is a cross-sectional schematic view of another embodiment of the valve according to the teachings herein, shown in a rest position. FIG. 7B is a cross-sectional schematic view of a valve in FIG. 7A in an actuated position. The valve 2 includes the valve body 4 coupled with a chamber housing 112 on one end and a cage 10 with a spool 14 slidably disposed therein on the opposite end of the valve body. The valve body 4 has a cavity 16, which houses the retainer plate 150 and a control chamber rod 36, as described above. The retainer plate 150 in this embodiment is not sealingly engaged with the wall of the cavity 16 so that fluid can flow over the retainer plate 150 to either side of the plate. The bias element 38 is disposed in the chamber 28 between the retainer plate 150 and the backup plate 6 to bias of the retainer plate to minimize the pilot chamber 22. The pilot piston 26 is disposed in the portion of the cavity 16 that forms the pilot chamber 22, which is fluidicly coupled with the pilot port 20. The valve body 4 further includes a chamber rod 116 about which is disposed a chamber housing 112. The chamber housing 112 is slidably and sealably engaged with the valve body 4 and the smaller chamber rod 116. A stop 114 can be coupled with the chamber rod 116 to restrict the maximum movement of the chamber housing 112. A compensator chamber 90 is formed between an internal surface of the housing 112 and an external surface of the valve body 4. The slidable engagement of the housing 112 with the valve body 4 allows the housing 112 to expand to form a variable volume for the compensator chamber 90. The compensator chamber 90 is fluidicly coupled with the first control chamber 28 through a flow restrictor 126A and a flow restrictor 126B. The flow restrictor 126A can block the flow from the first control chamber 28 into the compensator chamber 90 on the actuating stroke that moves the spool 14 from the position shown in FIG. 7A to the position shown in FIG. 7B and allow flow through an open flow restrictor 126A on the return stroke. The flow restrictor 126B can allow a restricted flow from the chamber 28 into the chamber 90 on the actuating stroke and allow free flow from the chamber 90 back into the chamber 28 on the return stroke.

Figure 8A:
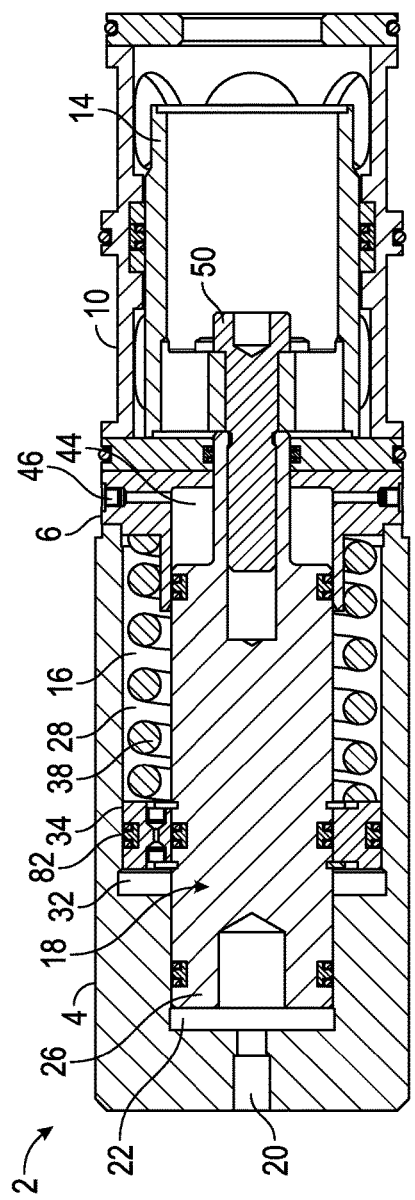
FIG. 8A is a cross-sectional schematic view of another embodiment of the valve according to the teachings herein, shown in a rest position.
Figure 8B:
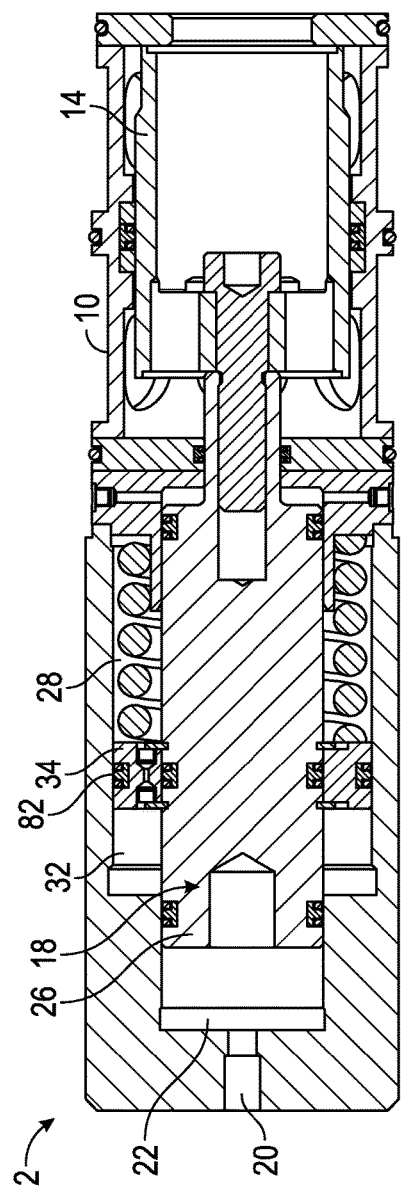
FIG. 8B is a cross-sectional schematic view of a valve in FIG. 8A in an actuated position.

FIG. 8A is a cross-sectional schematic view of another embodiment of a valve according to the present invention shown in a rest position. FIG. 8B is a cross-sectional schematic view of the valve in FIG. 8A in an actuated position. The valve body 4 includes the cavity 16 in which the actuating rod assembly 18 can be disposed. The actuating rod assembly 18 includes the pilot piston 26 disposed within the pilot chamber 22 and the dividing retainer plate 34 disposed in another portion of the cavity 16. The dividing retainer plate 34 is sealingly engaged with the wall of the cavity 16 to form a first control chamber 28 on one side and a second control chamber 32 on another side of the plate. The chamber 28 is fluidicly coupled with the chamber 32, but with a flow restrictor 82 disposed therebetween. To assist the valve in operation in various ambient environments, the ambient pressure port 46 can be formed in the valve backup plate 6 to fluidicly couple an ambient pressure chamber 44 to ambient pressure conditions. As the pilot piston 26 is actuated with pilot port pressure through pilot port 20, fluid in the first control chamber 28 can flow through the flow restrictor 82 into the second control chamber 32. On the return stroke, the fluid in the second control chamber 32 can flow through the flow restrictor 82 back into the first control chamber 28. On both the actuating stroke and return stroke, the fluid through the flow restrictor 82 controls the speed of the actuating stroke and the return stroke. In the embodiment shown in FIGS. 8A-8B, the rod diameter of the actuating rod assembly is constant and thus a compensator chamber is not useful to compensate for different diameters. The flow restrictor sizes (such as orifices) could be varied based on fluid viscosity. Thus, a lower viscosity fluid such as water or oil can be used or another fluid with much higher viscosity such as grease can be used.

Generally, the inventions shown in FIGS. 9A through 18B involve three separate enclosed fluid control chambers. The three chambers are connected thru restrictions and one-way check valves which assist at least the first control chamber filling, based on the actuator rod assembly direction.

When the pilot supply port is pressurized, the actuating rod assembly moves downward which pressurizes the first control chamber The fluid in the first control chamber is allowed to flow into the intermediately-positioned, compensation chamber through a flow restrictor that can be partially open but with another flow restrictor that can be closed in that flow direction. The fluid in the compensation chamber is also allowed to flow into the second control chamber through a second set of flow restrictors. One flow restrictor can be a check valve and the other an orifice, for example. When the pilot pressure is removed from the pilot port, the bias element can force the actuating rod assembly to move on a return stroke which pressurizes the second control chamber. The fluid from the second control chamber is allowed to flow into the compensator chamber through the flow restriction that determines the rate of fluid existing the second control chamber and thus the speed at which the actuating rod assembly returns to the rest position, with the other flow restrictor from the second control chamber being closed in some embodiments. Fluid is allowed to enter the first control chamber through the flow restrictors of the first control chamber for the next SPM valve actuation.

The compensator chamber which serves as an intermediate chamber between the first and second control chamber can also provide make-up fluid if any fluid is slowly lost across the static seals. The compensator chamber can be sealed by a piston or similar type device (bladder, and so forth) which keeps the control fluid on the inside and atmospheric reference on the outside. The compensator chamber can be integrated into the SPM valve assembly as most Figures are showing or it can be separate from the SPM valve and connected using hydraulic lines. When the compensator chamber is used separate from the SPM valve, it can serve to operate with one SPM valve or a group of SPM valves. The compensating aspect can also allow the valve to function in a similar fashion at sea level as well as at sea floor depths through ports or other openings to ambient conditions. During assembly of the SPM valve, the pre-loaded additional make-up fluid in the compensation chamber can also provide some "extra" fluid which can help account for any lost fluid due to leakage over time and provide a small amount of positive pressure to the internal chambers if a spring or gas chamber is incorporated.

As with latter embodiments described, various working fluids (water, oil, grease, and so forth) can affect the construction of the restrictions, making them less sensitive to contamination, temperature, and other factors in design.

Figure 9A:
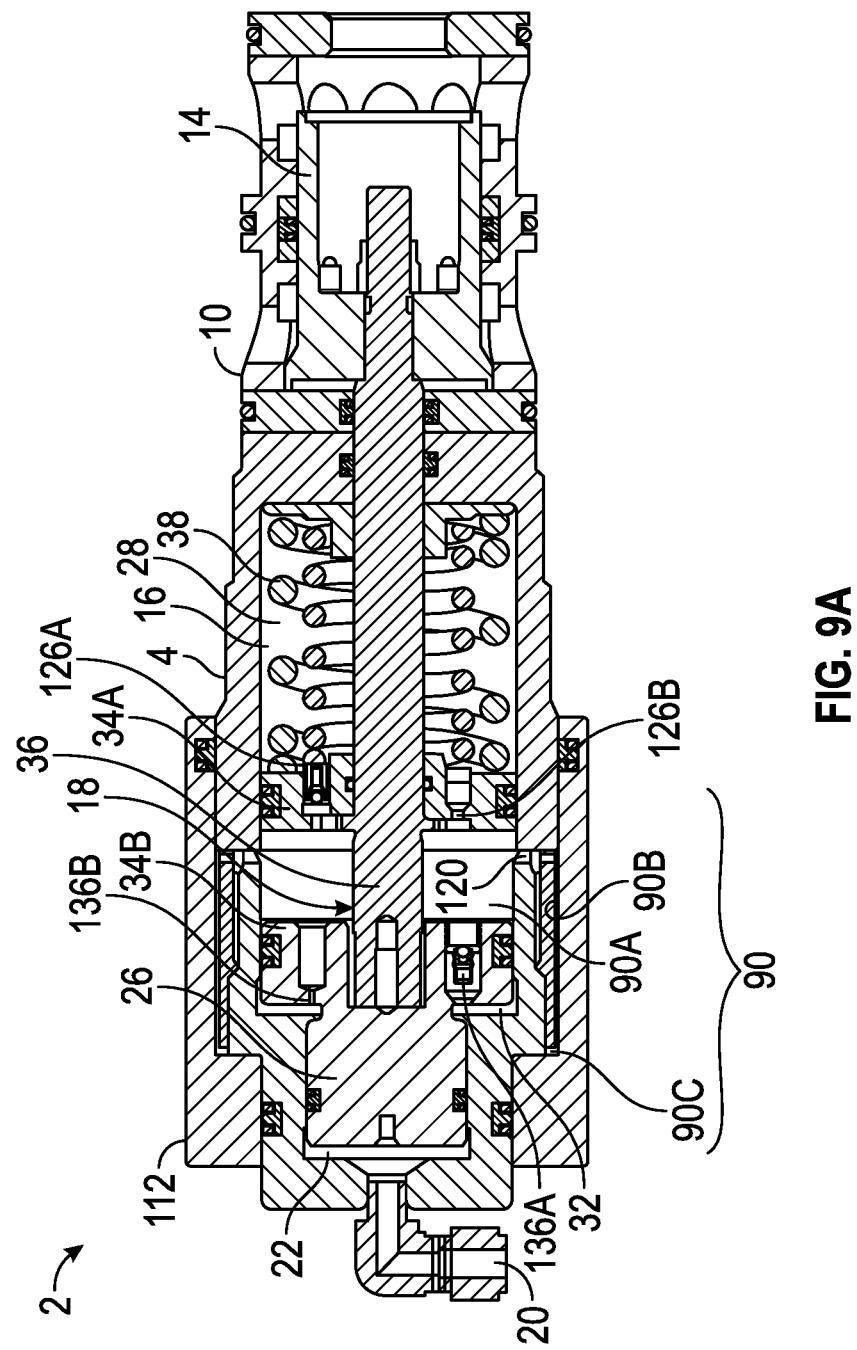
FIG. 9A is a cross-sectional schematic view of another embodiment of the valve according to the teachings herein, shown in a rest position.
Figure 9B:
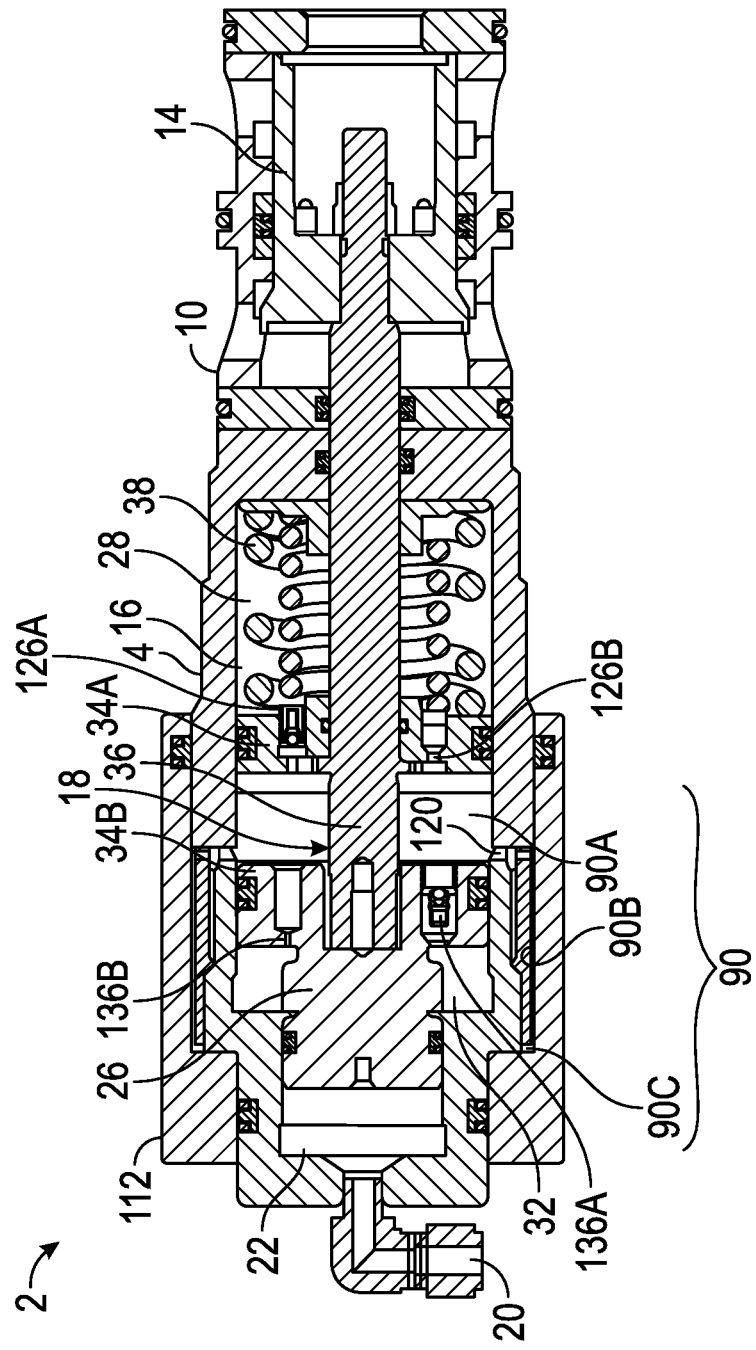
FIG. 9B is a cross-sectional schematic view of a valve in FIG. 9A in an actuated position.

More specifically for the embodiments shown, FIG. 9A is a cross-sectional schematic view of another embodiment of the valve according to the teachings herein, shown in a rest position. FIG. 9B is a cross-sectional schematic view of a valve in FIG. 9A in an actuated position. The valve 2 can include a first portion 4A of the valve body and a second portion 4B of the valve body coupled to the first portion. A chamber housing 112 can be slidably coupled with the first portion 4A on one end of the chamber housing and with the second portion 4B on the other end of the chamber housing. The chamber housing 112 allows the valve to expand within an influx of fluid in a portion of the compensator chamber described below. The pilot port 20 is fluidicly coupled to a pilot piston 22 with a pilot piston 26 disposed in a cavity 16B of the second portion 4B of the valve body. The actuating rod assembly 18 includes a portion that is the pilot piston 26, which forms the boundary of the pilot chamber 22. A control chamber rod 36 is coupled to the pilot piston and a dividing retainer plate 34A is coupled with the control chamber rod and sealingly engages the inner wall of the cavity 16A (together with cavity 16B forms the overall cavity 16), thus forming a first control chamber 28 on one side of the dividing retainer plate 34A and a compensator chamber portion 90A on a distal side of the dividing retaining plate from the first control chamber 28. The bias element 38 is disposed in the first control chamber 28 and biases the dividing retainer plate 34A, and hence the actuating rod assembly 18, toward the left side of the embodiment in the orientation shown in FIG. 9A, that is, away from the cage 10 in a deactivated rest position. The compensator chamber 90 having a portion 90A is fluidicly coupled through a flow path 120 into portions 90B and 90C formed around a valve body 4 but inward of the chamber housing 112. Because the chamber housing 112 is sealingly engaged with the external surface of the chamber housing 4, the portions 90B and 90C form with the portion 90A the compensator chamber 90. Further, a second control chamber 32 is formed between an inner surface of the cavity 16 and a second dividing retainer plate 34B that is disposed between the compensator chamber 90 and the second control chamber 32.

The three chambers, acting as control chambers, have flow restrictors disposed therebetween. Between the first control chamber 28 and the compensator chamber 90, a flow restrictor 126A and a flow restrictor 126B are disposed such as in the dividing retainer plate 34A. Thus, while the two chambers are fluidicly coupled, they are restricted in flow therebetween. The flow restrictor 126A can be a check valve that blocks flow on the actuating stroke from the first control chamber 28 into the compensator chamber 90, but is open on the return stroke to allow fluid to flow from the compensator chamber into the first control chamber. The flow restrictor 126B can be, for example, an orifice that allows restricted fluid to flow from the first control chamber 28 into the compensator chamber 90 on the actuating stroke and allows fluid to flow in the reverse direction on the return stroke. Because the flow is restricted, the speed of the actuating rod assembly 18 can be controlled on the actuating stroke through the flow restrictor 126B. On the return stroke, fluid can flow through the flow restrictor 126A which may be a check valve and therefore free flow with nominal restriction from the compensator chamber 90 into the first control chamber 28. While the flow restrictor 126B can still be open because of pressure differential, flow may be minimal through the flow restrictor 126B while most of the flow may flow through the flow restrictor 126A on the return stroke.

Further, between the compensator chamber 90 and the second control chamber 32, with flow restrictor 136A and flow restrictor 136B can be disposed through the dividing retainer plate 34B. The flow restrictor 136A can be a check valve in at least one embodiment that is open for flow from the compensator chamber 90 into the second control chamber 32, but blocks flow from the second control chamber 32 into the compensator chamber 90. The flow restrictor 136B can be a orifice in at least one embodiment that allows restricted flow in both directions between the compensator chamber 90 and the second control chamber 32. Thus, when pilot fluid is provided to the pilot chamber 22 to actuate the valve, the pilot piston moves right in the direction of the cage 10 shown in the exemplary orientation of FIG. 9A. Fluid in the first control chamber 28 flows through flow restrictor 126B into the compensator chamber 90 in a restricted manner to control the speed of the actuating assembly rod 18 and thus the actuation of the valve on the actuating stroke. Flow in the compensator chamber 90 flows freely into the second control chamber 32 through the flow restrictor 136A. However, on the return stroke, fluid in the compensator chamber 90 freely flows from the compensator chamber 90 into the first control chamber 28 through the flow restrictor 126 A but the flow from the second control chamber 32 flows through the flow restrictor 136B in a restricted manner that controls the return stroke speed of the actuating rod assembly 18.

FIG. 10A is a cross-sectional schematic view of another embodiment of the valve according to the teachings herein, shown in a rest position. FIG. 10B is a cross-sectional schematic view of a valve in FIG. 10A in an actuated position. The valve 2 can include a first portion 4A of the valve body and a second portion 4B of the valve body coupled to the first portion. A chamber housing 112 can be slidably coupled with the second portion 4B of the valve body to expand within an influx of fluid in a portion of the compensator chamber described below. In general, the valves for pilot port 20 fluidicly coupled to a pilot port 20 with a pilot piston 26 disposed in a cavity 16B of the second portion 4B of the valve body. The actuating rod assembly 18, that includes piston 26, further includes a first dividing retainer plate 34A and a second dividing retainer plate 34B with a chamber portion 90A disposed therebetween. Both dividing plates are coupled to the control chamber rod 36, which in turn is coupled to the spool 14 within the cage 10, as described above. The bias element 38 is disposed in the chamber 28 formed on a distal side from the chamber portion 90A relative to the dividing retainer plate 34A. The further chamber, a second control chamber 32, is formed on the distal side of the second retaining plate 34B, relative to the compensator chamber portion 90A. The compensator chamber portion 90A is connected through a flow path in the actuating rod assembly 18 to a compensator chamber portion 90B and then to a compensator chamber portion 90C, that collectively form the compensator chamber 90. The compensator chamber portion 90A, disposed between the first dividing retainer plate 34A and the second dividing retainer plate 34B, can expand as fluid flows into the chamber from the first control chamber 28 on the actuating stroke. Further, the compensator chamber portion 90C can also expand for incoming fluid by the chamber housing 112 sliding along the exterior surface of the valve body portion 4B in the actuating stroke to accommodate excess fluid from the first control chamber 28. In at least one embodiment, the flow can be restricted between the first control chamber 28 and the compensator chamber portion 90A by use of one or more flow restrictors. For example, a first flow restrictor 126A can be disposed between the chamber 28 and the chamber portion 90A. The flow restrictor 126A can be a check valve that is closed to flow from the chamber 28 into the chamber portion 90A in the actuating stroke, but open to flow from the chamber portion 90A into the chamber 28 on the return stroke. The flow between the chamber 28 and the chamber portion 90A can also be restricted by the flow restrictor 126B. For example, the flow restrictor 126B can be an orifice that restricts flow in both directions. The flow can also be restricted between the chamber portion 90A and the second control chamber 32. For example, a flow restrictor 136A can be disposed in the dividing retainer plate 34B where, in at least one example, the restrictor 136A can be a check valve that allows open flow from the chamber portion 90A into the chamber 32 but blocks flow from the chamber 32 into the chamber portion 90A. Another flow restrictor 136B can be disposed in the dividing retainer plate 34B between the chamber portion 90A and the chamber 32 that can allow flow in both directions.

In actuation, pilot fluid can pressurize the pilot piston 26 so that the actuating rod assembly 18 shifts to the right, based on the orientation shown in FIG. 10A, so that the spool 14 moves within the cage 10. As the actuating rod assembly 18 moves during the actuating stroke, fluid in the first control chamber 28 is blocked by a closed flow restrictor 126A but can flow through the flow restrictor 126B and thus control the speed of the actuating stroke. The fluid fills in the chamber portion 90A and any excess fluid then flows through the open flow restrictor 136A and to some extent the flow restrictor 136B into chamber 32. Fluid can also flow from the chamber portion 90A through a flow path internal to the actuating rod assembly 18 to fill a compensator chamber portion 90B and then to the chamber portion 90C. Additional fluid in portion 90C can pressurize the chamber portion and cause the chamber housing 112 to shift to the left in the orientation shown in FIG. 10A to allow expansion for the volume of the chamber portion 90C. On the return stroke, the bias element 38 expands thereby pushing the dividing retainer plate 34A away from the cage 10 to compress the chamber portion 90A and the chamber 32. The fluid in chamber portion 90A and the other fluid in 90B and 90C can re-enter the chamber 28 through the open flow restrictor 126A, as well as through the flow restrictor 126B, although the flow restrictor 126B will still be restricting flow. Fluid in the second control chamber 32 flows into the chamber portion 90A through the flow restrictor 136B but in a restricted manner, while flow is blocked through the closed flow restrictor 136A. Thus, the rate of the fluid flow through the flow restrictor 136B controls the return stroke speed.

FIG. 11A is a cross-sectional schematic view of another embodiment of the valve according to the teachings herein, shown in a rest position. FIG. 11B is a cross-sectional schematic view of a valve in FIG. 11A in an actuated position. The valve 2 includes the valve body 4 coupled to the cage 10 with a spool disposed therein and a chamber housing 112 slidably and sealingly engaged with an exterior surface of the valve body 4. The valve body 4 includes first portion 4A coupled to a second portion 4B. The valve body 4 includes a cavity 16 in which at least a portion of the actuating rod assembly 18 is disposed. A pilot port 20 is fluidicly coupled to the pilot chamber 22 and bounded by the pilot piston 26. The pilot piston 26 is coupled with a dividing retainer plate 34 and sealingly engaged with the inner wall of the cavity 16 to form a first control chamber 28 and a second control chamber 32 on a distal side of the dividing retainer plate 34 from the chamber 28. The bias element 38 is disposed in chamber 28 and biases the dividing retainer plate 34 in a rest position to the left of the diagram, that is, with the spool 14 in a retracted position and sealed up against the seal plate 8. An internal cavity of the actuating rod assembly 18 forms a compensation chamber portion 90A that is fluidicly coupled through flow passage ways in the actuating rod assembly 18 to a compensation chamber portion 90B and thence to a compensator chamber portion 90C. The compensator chamber portion 90C is formed between the outer surface of the valve body 4 such as the portion 4B, and the internal surfaces of the chamber housing 112 disposed thereon. The chamber housing 112 can slide along the body 4, depending on the amount of fluid in the chamber portion 90C. The first control chamber 28 is fluidically coupled to the compensator chamber 90 but flow is restricted by one or more flow restrictors, such as flow restrictor 126A and flow restrictor 126B. As one example, the flow restrictor 126A can be a check valve that is oriented to close on an actuating stroke but open on a return stroke. The flow restrictor 126B, for example, can be an orifice that can restrict the flow on the actuating stroke and the return stroke. Further, the compensator chamber portion 90A is fluidicly coupled to the second control chamber 32 with one or more flow restrictors. For example, the flow first restrictor 136A can be a check valve that restricts flow to a closed position when fluid from the second control chamber 32 would attempt to flow to the compensator chamber 90. A second flow restrictor 136B can restrict flow in both directions, between the compensator chamber 90 and the second control chamber 32.

In operation, fluid flows through the pilot port 20 into the pilot chamber 22 to actuate the valve by moving the pilot piston 26 in actuating stroke to unseat the spool 14 from the seal plate 8 and move toward the seal plate 12. Fluid in the first control chamber 28 can flow through the flow restrictor 126B, while flow restrictor 126A is closed in the actuating stroke. The fluid flows through a flow channel into the compensator chamber 90 and excess fluid flows through the open flow restrictor 136A into the second control chamber 32. Fluid can also flow through the flow restrictor 136B in a restricted manner if, for example, the flow restrictor is an orifice. Depending on the volume, the chamber housing 112 may shift to the left shown in the orientation of FIG. 11A to expand the volume of the chamber portion 90C. Further, the chamber portion 90C can provide make-up fluid that can compensate for leakage in the valve system and, can be preloaded in the chamber portion 90C. When the pilot pressure is released in chamber 22 for a return stroke, the bias element 38 can return the dividing retainer plate 34 and the spool 14 to a rest position so that the spool 14 can re-engage and seal against the seal plate 8. Fluid in the second control chamber 32 can flow through the flow restrictor 136B in a in a restricted flow manner into the chamber 90, but is restricted from flowing through the closed flow restrictor 136A. Fluid from the compensator chamber 90 can flow through the open flow restrictor 126A into the chamber 28 and through to some extent through the restrictor passage of the flow restrictor 126B.

Figure 12A:
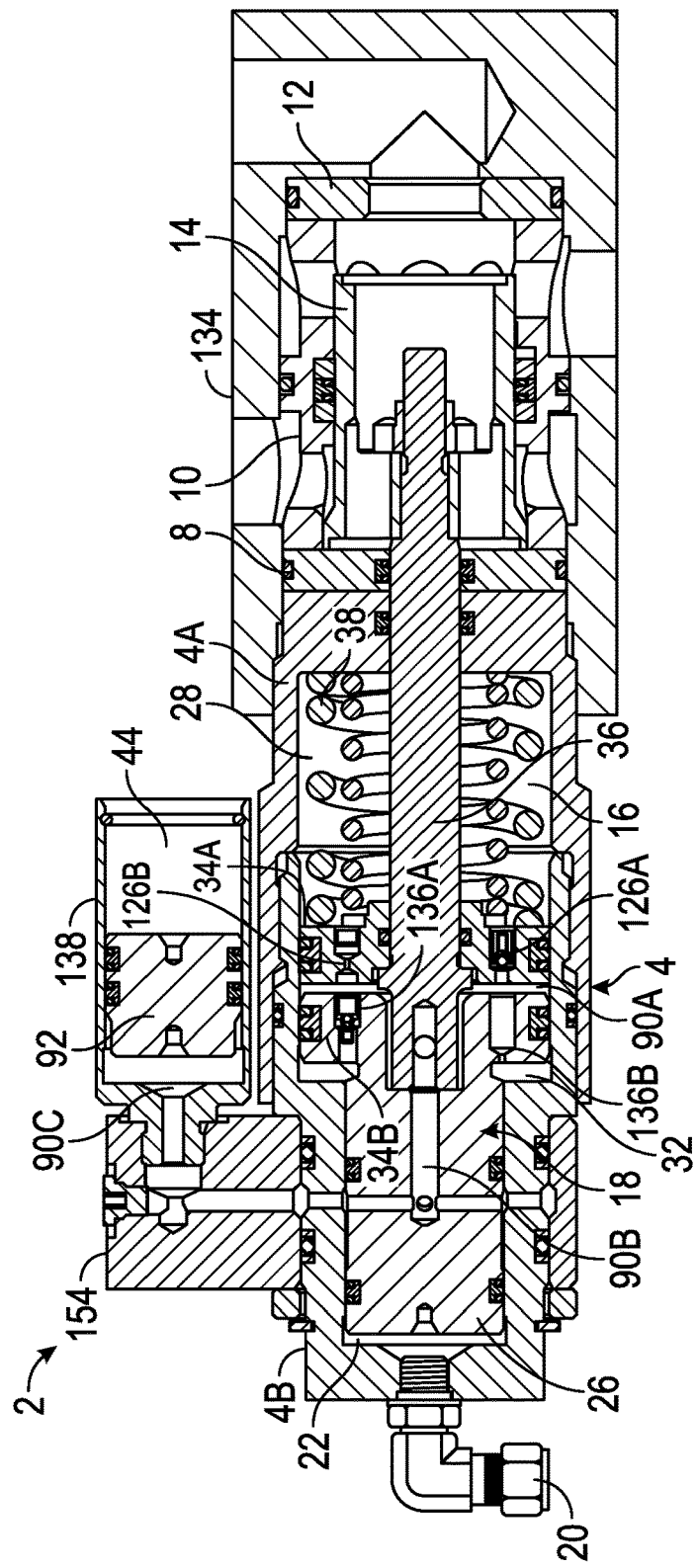
FIG. 12A is a cross-sectional schematic view of another embodiment of the valve according to the teachings herein, shown in a rest position.
Figure 12B:
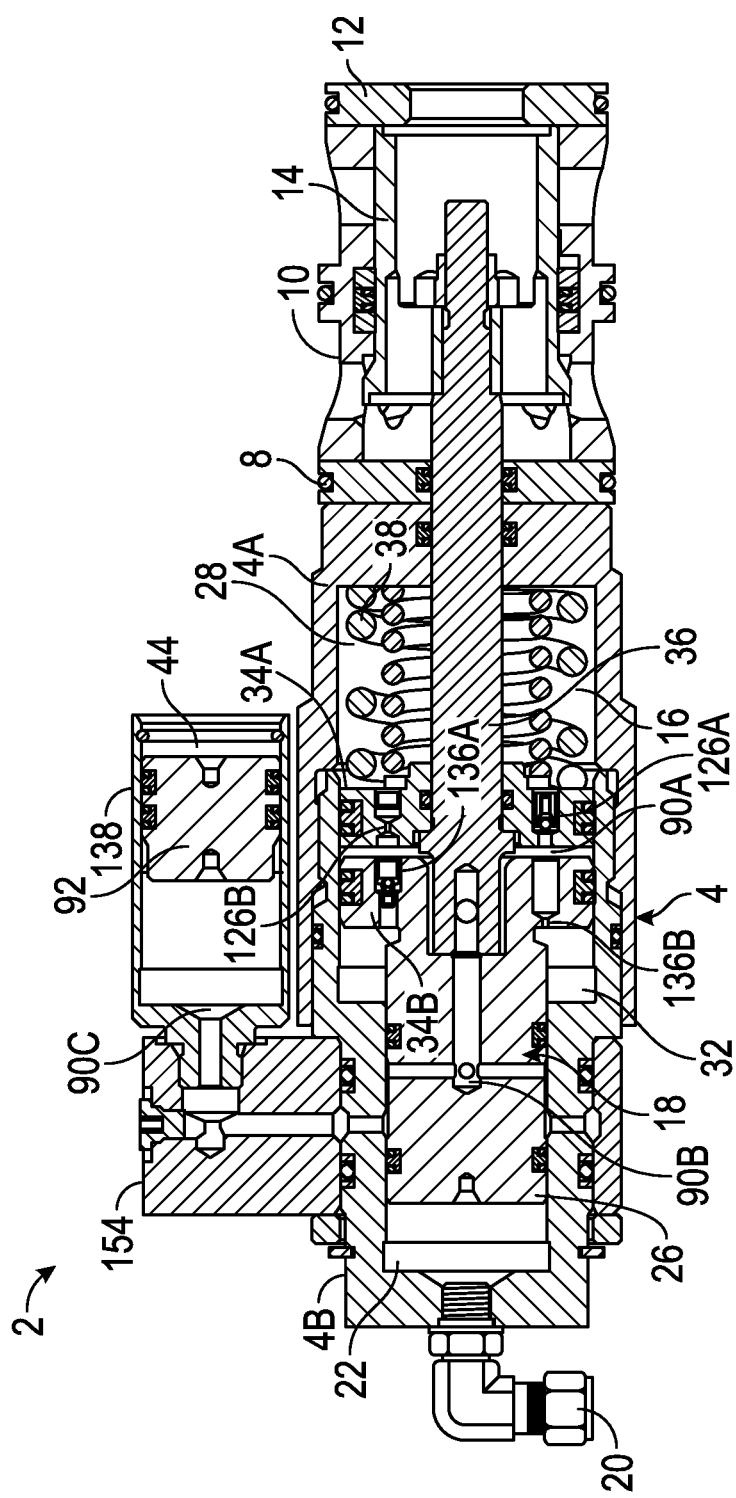
FIG. 12B is a cross-sectional schematic view of a valve in FIG. 12A in an actuated position.

FIG. 12A is a cross-sectional schematic view of another embodiment of the valve according to the teachings herein, shown in a rest position. FIG. 12B is a cross-sectional schematic view of a valve in FIG. 12A in an actuated position. The embodiment in FIGS. 12A-12B resembles, for example, the embodiment of FIGS. 10A-10B, but replaces the compensated chamber housing 112 with a different chamber housing 138 external to the valve body 4. The valve body 4 can include a first portion 4A that generally encloses a portion of actuating rod assembly 18 and a second portion 4B that generally encloses other portions of the actuating rod assembly, including the pilot piston 26 that forms the boundary of the pilot chamber 22 that is fluidicly coupled to the pilot port 20. The actuating rod assembly 18 further includes a first dividing retainer plate 34A and a second dividing retainer plate 34B. Both dividing retainer plates are sealingly engaged with an inner wall of the cavity 16 in the valve body 4. A control chamber rod 36 is coupled to the dividing retainer plates and the pilot piston and is further coupled through the seal plate 8 to the spool 14 that is slidably engaged with the cage 10. In this illustration, the valve 2 is coupled with a device 134 with ports aligned to ports in the cage 10. The dividing retainer plate 34A divides the cavity 16 into a first control chamber 28 and a compensator chamber portion 90A. A bias element 38 is disposed in the first compensator chamber 28. Further, the dividing retainer plate 34B separates the compensator chamber portion 90A from a second control chamber 32. A chamber housing 138 is coupled with an adapter 154 to provide a port for coupling the chamber housing 138 to the adapter and then to the valve body 4. The chamber housing 138 includes a compensator piston 92 that divides the internal volume of the chamber housing 138 into two portions with a first portion being a compensator chamber portion 90C and the second portion forming an ambient pressure chamber 44 that is open to ambient conditions. The compensator chamber portion 90C is fluidically coupled to the chamber portion 90A through the intermediate chamber portion 90B in the actuating rod assembly 18.

The first control chamber 28 is fluidically coupled with, but restricted in flow from, the compensator chamber 90 by one or more flow restrictors. A flow restrictor 126A restricts flow from the first control chamber 28 to the compensator chamber 90 by closing during the actuating stroke. For example, the flow restrictor 126A can be a check valve that is closed on the actuating stroke and open on the return stroke. A flow restrictor 126B restricts flow between the chamber 90 and the chamber 28 and can be an orifice for restricting flow in both directions.

The compensator chamber 90 also is fluidicly coupled with, but restricted in flow from, the second control chamber 32 by one or more flow restrictors. A flow restrictor 136A can be open from the compensator chamber 90 to the chamber 32 during the actuating stroke but closed on the return stroke. A flow restrictor 126B can restrict flow between the chamber 90 and the chamber 32 in both directions of the actuating stroke and the return stroke.

Upon actuation by pressurizing the pilot chamber 22 with pilot fluid, the piston 26 moves the actuating rod assembly 18. Fluid in the chamber 28 flows through the flow restrictor 126B but can be blocked from flowing through the 126A because of a closed flow direction and thus the speed of the actuating stroke is controlled by the flow restrictor 126A. The fluid enters the chamber portion 90A and can flow through the open flow restrictor 136A and to some extent through the flow restrictor 136B into the second control chamber 32. When the pilot pressure is removed from the piston 26, the bias element 38 exerts a force on the dividing retainer plate 34A to move the plate 34A back to a rest position. Fluid in the compensator chamber 90 can flow through the open flow restrictor 126A into the chamber 28 and, to some extent, the flow restrictor 126B, which remains a restricted flow path on the return stroke. Further, fluid that is in the second control chamber 32 can through the flow restrictor 136B in a restricted manner into the chamber 90, but can be blocked from flowing through the closed flow restrictor 136B into the chamber 90 on the return stroke and thus the speed of the return stroke is controlled by the flow restrictor 136B. On the return stroke, vacuum created by the chamber 28 being pushed into a rest position can pull the compensator piston into a reset position to minimize the chamber portion 90C (as can the vacuum in other compensator chamber embodiments).

Figure 13B:
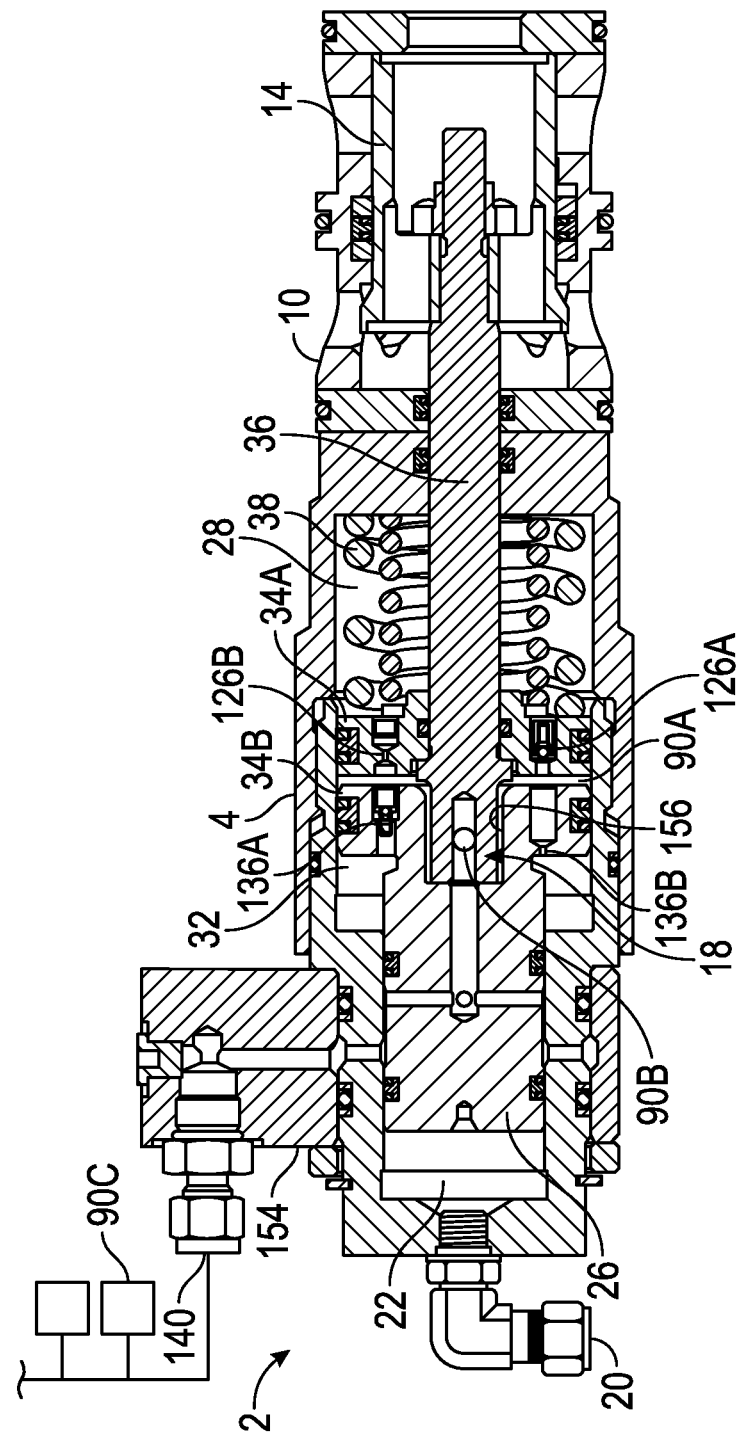
FIG. 13B is a cross-sectional schematic view of a valve in FIG. 13A in an actuated position.

FIG. 13A is a cross-sectional schematic view of another embodiment of the valve according to the teachings herein, shown in a rest position. FIG. 13B is a cross-sectional schematic view of a valve in FIG. 13A in an actuated position. The embodiment shown in FIGS. 13A-13B is similar to the embodiments shown in FIGS. 10A-10B and 12A-12B for actuation. However, an external port 140 can be remotely coupled to one or more other chambers, such as other compensator chambers, which themselves may be coupled to other valves. In general, the pilot pressure through the pilot port 20 into the pilot chamber 22 actuates the pilot piston 26 which moves the actuating rod assembly 18 to shift the spool 14. The fluid in chamber 28 flows through the flow restrictor 126B, but does not flow through a closed flow restrictor 126A on the actuating stroke to control the actuation speed of the valve. The fluid flows into and can expand the volume in the compensator chamber portion 90A. In this embodiment, the fluid can flow through annulus portions between the outer periphery of the control chamber rod 36 and an inner periphery of cavity 156 formed within the actuating control assembly 18, into the chamber portion 90B formed in the actuating rod assembly 18, then through ports in the valve body 4 to an external adapter 154. An external port 140 on the adapter 154 can be fluidicly coupled through conduits to one or more externally disposed compensator chambers 90C that the fluid can flow therein. On the return stroke, the bias element 38 expands and can move the actuating rod assembly 18 back to a rest position. The fluid in the compensator chamber portion 90C can flow through the external port 140 into the flow channels through the adapter 154, the chamber portion 90B, the annular flow passages between the wall of the cavity 156 and the periphery of the control chamber rod 36, into the chamber portion 90A, and through an open flow restrictor 126A into the chamber 28 and, to some extent, through the flow restrictor 126B in a restricted manner. Further, fluid in the second control chamber 32 can flow through the flow restrictor 136B which is still in a restricted mode, but is blocked by the closed flow restrictor 136A on the return stroke to control the return speed of the valve.

FIG. 14A is a cross-sectional schematic view of another embodiment of the valve according to the teachings herein, shown in a rest position. FIG. 14B is a cross-sectional schematic view of a valve in FIG. 14A in an actuated position. FIG. 14A somewhat deviates from other prior embodiments in that the tight clearance between the control chamber rod 36 and the retainer plate 150 itself forms a flow restrictor for high viscosity fluids, such as grease, and can be used in combination with flow restrictors formed by one-way seals described herein. Thus, the general concept described above using flow restrictors to control the speed of the actuation and/or return stroke applies to this embodiment as well. The actuating rod assembly 18 includes the pilot piston 26 that is sealingly engaged with the inner cavity 16 of the valve body 4 to form the pilot chamber 22 that is fluidicly coupled with the pilot port 20. The actuating rod assembly 18 includes the control chamber rod 36 that is slidably engaged with a chamber divider 142 fixedly disposed in the cavity 16. The actuating rod assembly 18 further includes an expanded portion 158 that is sealingly engaged with the inner perimeter of the cavity 16, similar to the engagement by the pilot piston 26. The expanded portion 158 is coupled with a retainer plate 150 that supports the position of the bias element 38 on one end. A support plate 6 supports the bias element on a distal end from the retainer plate. The bias element 38 and the retainer plate 150 are disposed in an ambient pressure chamber 44 that is open to ambient conditions through an ambient pressure port 46.

The chamber divider 142 includes a central port 144 that receives fluid from either the chamber 28 or the chamber 32, depending on the direction of fluid flow. Additionally, a fill port 152 can be fluidicly coupled to the port 144 to fill the chambers 28 and/or 32 with fluid, such as grease. A further port similar to port 144 can be formed in the distal side of the chamber divider 142 through the valve body 4 and can be closed with a plug 172. An annular flow path is formed at an interface 184 between an inner periphery of the chamber divider 142 and the outer periphery of the control chamber rod 36. The annular flow path size depends upon the diameter of the interface and the respective gap between the chamber divider 142 and the control chamber rod 36. The annular flow path can form an interface flow restrictor 146. The interface flow restrictor 146 can be adjusted by varying the dimensions of the adjacent components forming the interface. It is expected that a few thousandths of an inch or less is sufficient to allow a controlled flow of a high viscosity fluid, such as grease, to form the flow restrictor 146 at the interface. The flow restrictor 146 can be include a flow restrictor portion 146A adjacent the chamber 28 and a flow restrictor portion 146B adjacent the chamber 32.

Further, another set of flow restrictors 148 can be disposed at an outer periphery of the chamber divider 142 adjacent the wall of the inner periphery of the cavity 16. In the exemplary embodiment, a flow restrictor 148A can be a one-way seal that is disposed adjacent the chamber 28. The flow restrictor 148A can be open to a flow from the port 144 to the chamber 28, but closed to a flow from the chamber 28 to the port 144. Similarly, a flow restrictor 148B can be disposed adjacent the chamber 32 and can be open to a flow from the port 144 to the chamber 32, but closed to a flow from the chamber 32 to the port 144.

Restrictive flow paths are formed by the combinations of the interface flow restrictors 146A and 146B and the flow restrictors 148A and 148B. In operation, pilot fluid can pressurize the pilot chamber 22 to push the pilot piston 26 in the actuating stroke. The control chamber rod 36 moves to the right in the illustrated orientation of FIG. 14A to unseat the spool 14 from the seal plate 8. The piston 26 compresses the volume in the first control chamber 28 and forces fluid, such as grease, out of the chamber 28 along at least two flow paths. The first flow path can be formed in the restricted annular space through the interface flow restrictors 146A and 146B to allow a restricted flow of the fluid from the first control chamber 28 into the second control chamber 32. Further, a portion of the fluid from first control chamber 28 can pass through the flow restrictor 146A, through the flow chamber port 144, and then pass through the flow restrictor 148A and into the chamber 32. However, the fluid in the first control chamber 28 does not pass directly through the flow restrictor 148A to the port 144, because the flow restrictor acts as a check valve in that flow direction to restrict any flow therethrough. On a return stroke, when the pilot pressure in the pilot chamber 22 is relieved, the bias element 38 expands and exerts a force on the retainer plate 150 and, hence, to the expanded portion 158 and the remainder of the actuating rod assembly 18. The fluid in the second control chamber 32 is then pressed to flow into the first control chamber 28 but is restricted by the flow restrictors 146 and 148. The fluid in the second control chamber 32 can flow through the interface flow restrictor 146 (both flow restrictors 146A and 146B) but in a restricted manner back into the control chamber 28. Fluid can also flow from the control chamber 32 through the flow restrictor 146B into the port 144, and through the flow restrictor 148A into the chamber 28. However, fluid from the second control chamber 32 does not flow directly through the flow restrictor 148B to the chamber 28, because the flow restrictor acts as a check valve in that flow direction to restrict any flow therethrough.

FIG. 15A is a cross-sectional schematic view of another embodiment of the valve according to the teachings herein, shown in a rest position. FIG. 15B is a cross-sectional schematic view of a valve in FIG. 15A in an actuated position. The embodiment in FIGS. 15A-15B is similar to the embodiment shown in FIGS. 14A-14B. However, the chamber divider 142 can be integral with the valve body 4 or otherwise coupled, so that there is no flow path therebetween. Further, the seals for the flow restrictor 148 in FIGS. 14A-14B can be replaced by ports between the chamber 28 and chamber 32 in FIGS. 15A-15B. The flow restrictor 148 in FIGS. 15A-15B can include a flow restrictor 148A formed by a orifice between the first flow chamber 28 and the port 144, and a flow restrictor 148B formed by an orifice between the port 144 and the second control chamber 32. The interface 184 between the inner periphery of the chamber divider and the outer periphery of the control chamber rod is in close tolerance that restricts the flow between the chambers 28 and 32 to form the interface flow restrictor 146, having a flow restrictor 146A and flow restrictor 146B.

In operation, pilot fluid pressure in the pilot chamber 22 forces the pilot piston 26 to move from a rest position to cause the control chamber rod 36 to slide through the chamber divider 142. The pilot piston 26 compresses the chamber 28 so that fluid in the chamber flows through the interface flow restrictor 146 into the second control chamber 32 in a restricted manner. Further, fluid in the first control chamber 28 can flow through the flow restrictor 148 into the flow chamber 32. On the return stroke, the fluid in the chamber 32 can follow a similar path as noted above into the chamber 28 through the flow restrictor 146 a and the flow restrictor 148 in conjunction with the port 144.

FIG. 16A is a cross-sectional schematic view of another embodiment of the valve according to the teachings herein, shown in a rest position. FIG. 16B is a cross-sectional schematic view of a valve in FIG. 16A in an actuated position. The valve 2 in FIGS. 16A-16B is a similar concept to FIGS. 15A-15B in using a fixed chamber divider 142 with an actuating rod assembly 18 sliding therethrough. However, this embodiment includes a compensator chamber portion 90B to flow fluid between the first and second control chambers 28 and 32, respectively, in conjunction with a flow restrictor 82A fluidicly coupled to the chamber 28 and a flow restrictor 82B fluidicly coupled to the chamber 32. Further, this embodiment includes a compensation chamber portion 90A fluidicly coupled with the compensator chamber portion 90B and hence to both the control chambers 28 and 32 through the flow restrictors 82A and 82B, respectively. More specifically, the valve body includes a cavity 16A having a pilot piston 26 disposed therein to form a pilot chamber 22 on one side and a first control chamber 28 on the distal side of the pilot piston. A fixed chamber divider 142 is formed with the valve body 4 to separate the cavity 16A from a cavity 16B. Portions of the actuating rod assembly 18 are slidably disposed in the cavity 16A, including the pilot piston 26, a portion of the control chamber rod 36. Other portions of the actuating rod assembly 18 are disposed in the valve cavity 16B. An expanded portion 158 of the control chamber rod 36 is sealingly engaged with the inner wall of the valve cavity 16B and forms a second control chamber 32 between the chamber divider 142 and the expanded portion 158. An ambient pressure chamber 44 is formed on a distal side of the expanded portion 158 that is open to an ambient environment through a port 46A. The bias element 38 is disposed in the ambient chamber 44 and biases the actuating rod assembly 18 in a rest position so that the spool 14 can sealingly engage the seal plate 8. Further, the compensator chamber portion 90B is fluidicly coupled with the compensator chamber portion 90A formed in a cavity of the enlarged portion of 158 and bounded by a compensator piston 92 sealingly engaged with the inner periphery of the cavity 94. The other side of the compensator piston distal from the compensator chamber portion 90A is in fluid communication with the ambient pressure chamber 44 through a port 46B to compensate for pressure differentials caused by ambient conditions. The compensator piston 92 is biased by a bias element 96 toward the compensator chamber portion 90B to establish a minimum volume in the compensator chamber portion 90A.

In operation, fluid in the pilot chamber 22 forces the pilot piston 26 to move in an actuating stroke and thus pressurize the first control chamber 28 to flow through the flow restrictor 82A into the compensator chamber portion 90B, into the compensator chamber portion 90A, and through the flow restrictor 82B into the second flow chamber 32. As fluid flows into the chamber portion 90A, the compensator piston 92 is pushed in a direction opposite of the force exerted bias element 96, so that bias element 96 is compressed. Further, the movement of the pilot piston in the direction indicated compresses the bias element 38. On a return stroke, fluid in the compensator chamber portion 90A can flow back through the compensator chamber portion 90B and into the first control chamber 28 through the flow restrictor 82A. Further, the fluid in the second control chamber 32 can flow back through the flow restrictor 82B, through the compensator chamber portion 90B, through the flow restrictor 82A, and into the chamber 28.

Figure 17A:
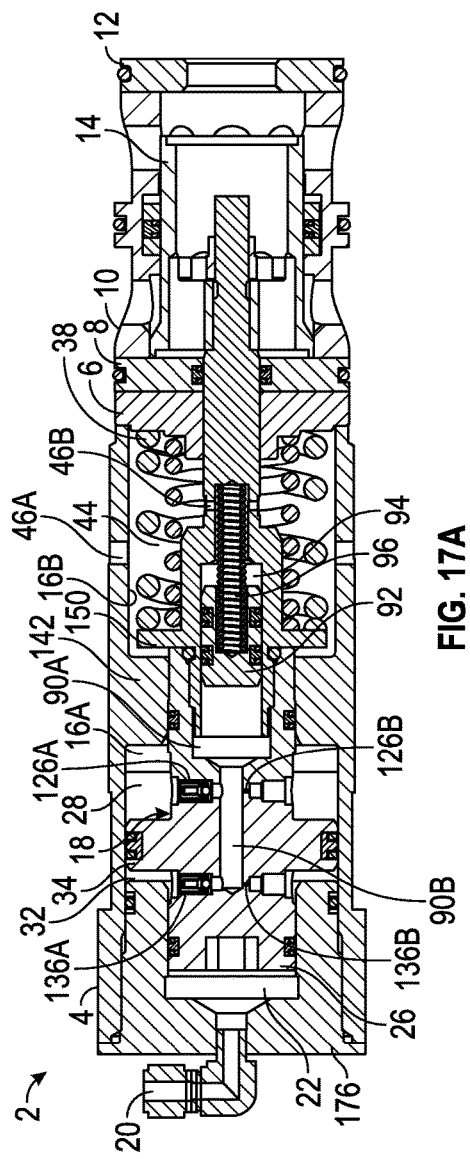
FIG. 17A is a cross-sectional schematic view of another embodiment of the valve according to the teachings herein, shown in a rest position.
Figure 17B:
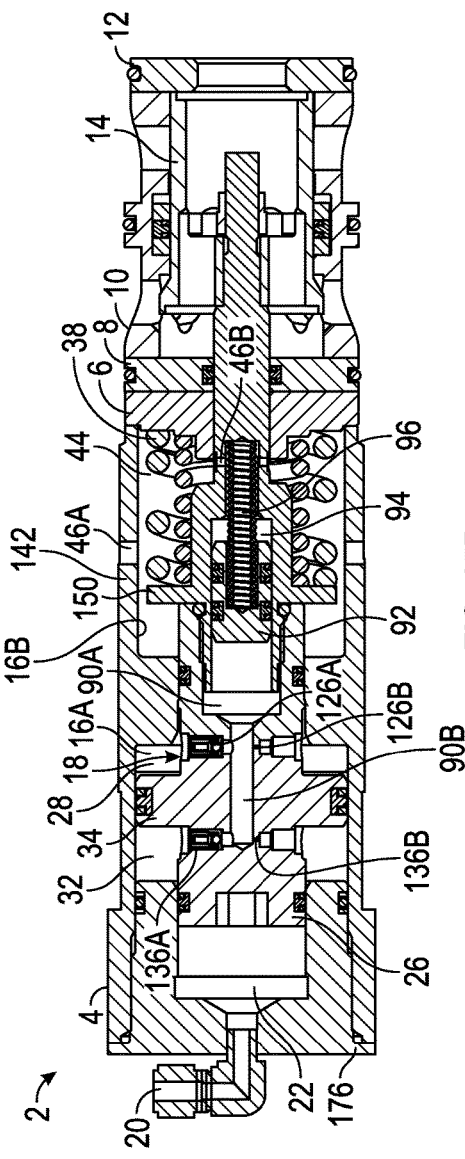
FIG. 17B is a cross-sectional schematic view of a valve in FIG. 17A in an actuated position.

FIG. 17A is a cross-sectional schematic view of another embodiment of the valve according to the teachings herein, shown in a rest position. FIG. 17B is a cross-sectional schematic view of a valve in FIG. 17A in an actuated position. A valve body 4 includes having a first cavity 16A and a second cavity 16B, sealingly separated by chamber divider 142. The cavity 16A is sealed on one end with a pilot housing 176, which includes a pilot port 20 fluidicly coupled to a pilot chamber 22. A pilot piston 26 forms a longitudinal boundary for the pilot chamber 22 and is slidably and sealingly engaged within the pilot housing 176. The pilot piston 26 is connected to other portions of an actuating rod assembly 18, including a divider retaining plate 34 that is slidably and sealingly engaged with the inner wall of the cavity 16A. A first control chamber 28 is formed between the divider retaining plate 34 and the chamber diverter 142, and a second control chamber is formed between the pilot piston 22 and the dividing retainer plate 34. The actuating rod assembly 18 includes a cavity 94 in which a compensator chamber portion 90A is formed with a compensator piston 92 forming a longitudinal boundary for the compensator chamber portion 90A. The compensator piston 92 is biased by a bias element 96 to establish a minimum volume for the compensator chamber portion 90A. The cavity 94 is fluidicly open through a port 46B to an ambient pressure chamber 44, which itself is open to ambient conditions through an ambient pressure port 46A. The ambient pressure chamber 44 formed in the cavity 16B of the valve body contains the bias element 38 with a retainer plate 150 disposed on one end of the actuating rod assembly 18 and a backup plate 6 disposed on a distal end of the bias element 38 from the retainer plate 150.

The control chambers 28 and 32 can fluidically communicate through flow restrictors. The flow restrictors are fluidically coupled to each other through a compensator chamber portion 90B formed in the actuating rod assembly 18. For example, in the embodiment shown, a flow restrictor 136A can be coupled between the compensator chamber portion 90B and the chamber 32. Another flow restrictor 136B can be fluidicly coupled between the compensator chamber portion 90B and the chamber 32, and can be, for example, a check valve that is uni-directional in flow by being open in a flow direction from the compensator chamber portion 90B into the chamber 32, but closed in the reverse direction. Another flow restrictor 136B can be coupled between the compensator chamber portion 90B and the chamber 32, and can be, for example, an orifice that restricts flow bi-directionally between the compensator chamber portion 90B and the chamber 32. Similarly, a flow restrictor 126A can be fluidicly coupled between the compensator chamber portion 90B and the first control chamber 28, and can be, for example, a check valve that is uni-directional in flow by being open in a flow direction from the compensator chamber portion 90B into the chamber 32, but closed in the reverse direction. Another flow restrictor 126B can be coupled between the compensator chamber portion 90B and the chamber 28, and can be, for example, an orifice that restricts flow bi-directionally between the compensator chamber portion 90B and the chamber 28. Also, the compensator chamber portion 90B can be fluidically coupled with the compensator chamber portion 90A. Thus, the first control chamber 28 can be fluidically coupled to the compensator chamber portion 90A through the flow restrictors 126A and 126B. The second control chamber 32 can be fluidicly coupled to the compensator chamber portion 90A through the flow restrictors 136A and 136B.

In operation on the actuating stroke, pilot pressure in the chamber 22 can force the pilot piston 26 to move and shift the spool 14 away from the seal plate 8 and toward the seal plate 12. Fluid in the first control chamber 28 can be forced to flow through the flow restrictor 126B into the compensator chamber portion 90B to control the actuation speed, but is blocked from flowing through the flow restrictor 126A. The fluid from the chamber 28 in the compensator chamber portion 90B can flow into the compensator chamber portion 90A and through the open flow restrictor 136A, and to some extent through the flow restrictor 136B but with a restricted flow, into the compensator chamber portion 90A. On a return stroke, fluid in the second control chamber 32 can be forced to flow through the flow restrictor 136B into the compensator chamber portion 90B to control the speed of the return stroke, but is blocked from flowing through the flow restrictor 136A. The fluid from the compensator chamber portion 90A can flow through the open flow restrictor 126A, and to some extent through the flow restrictor 126B but with a restricted flow, into the chamber 28. Thus, on the actuating stroke and the return stroke, the speed of the valve actuation through control of the fluid in and out of the control chambers 28 and 32 is determined by the amount of flow through the flow restrictors 126B and 136B.

Figure 18A:
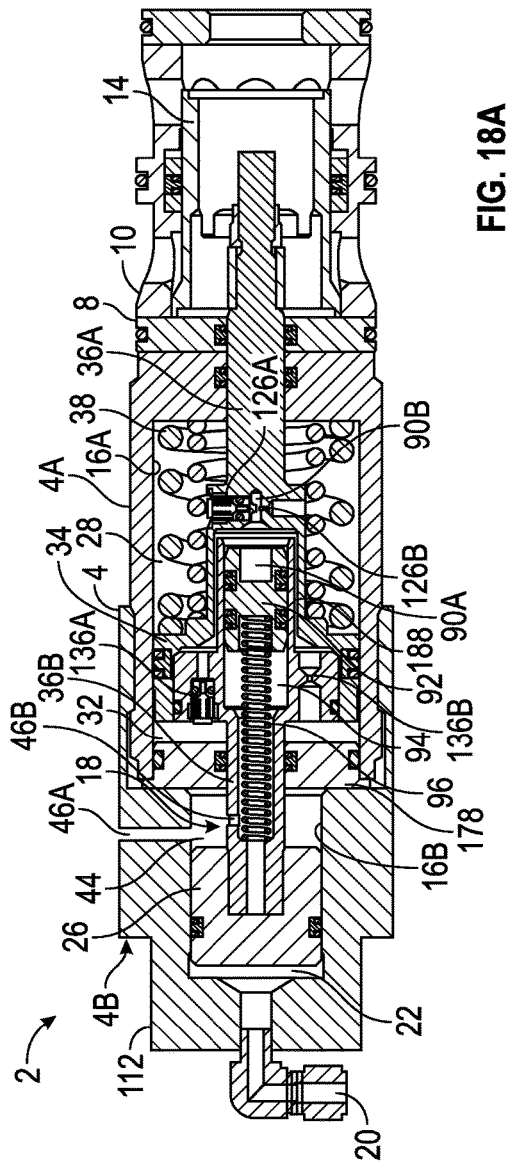
FIG. 18A is a cross-sectional schematic view of another embodiment of the valve according to the teachings herein, shown in a rest position.
Figure 18B:
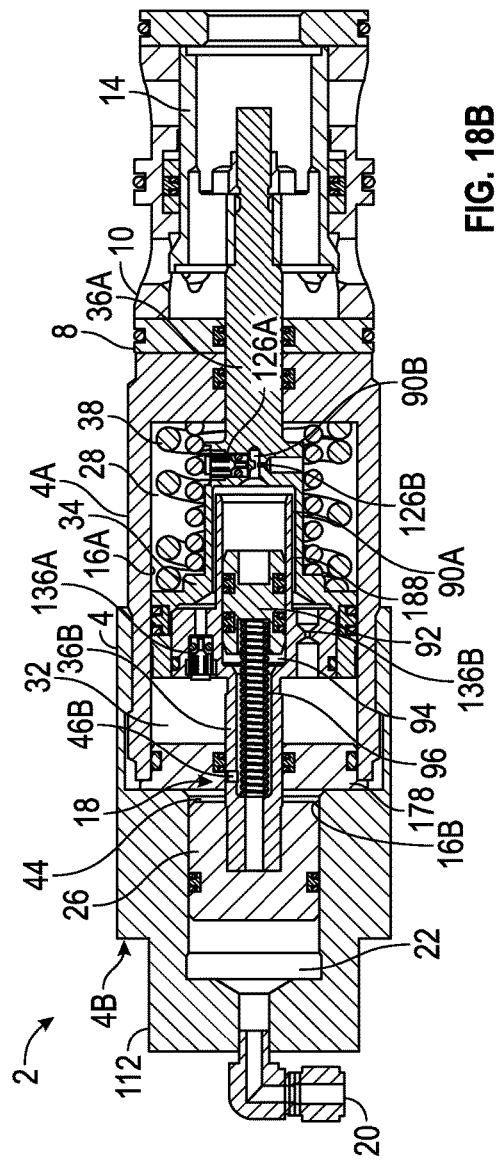
FIG. 18B is a cross-sectional schematic view of a valve in FIG. 18A in an actuated position.

FIG. 18A is a cross-sectional schematic view of another embodiment of the valve according to the teachings herein, shown in a rest position. FIG. 18B is a cross-sectional schematic view of a valve in FIG. 18A in an actuated position. The valve body 4 can include multiple portions, such as the portion 4A and the portion 4B coupled together, having a cavity 16A and cavity 16B, respectively, that combines to form a cavity 16. In the exemplary embodiment, the valve body 4B can include a chamber housing 112 that includes a pilot port 20 fluidically coupled with a pilot chamber 22 within the cavity portion 16B having a pilot piston 26 slidably and sealingly engaged with the inner perimeter of the cavity portion. An ambient pressure chamber 44 is also formed in the cavity portion 16B on a distal side of the pilot piston 26 from the pilot chamber 22. The ambient pressure chamber 44 is open to ambient conditions through a port 46A. A seal plate 178 seals the ambient pressure chamber 44 of cavity portion 16B from the cavity 16A and components disposed therein. The pilot piston 26 is a portion of an actuating rod assembly 18 that also includes a control chamber rod 36 with a control chamber rod 36B that can slidably and sealingly pass through the seal plate 178. A cavity 94 is formed within the control chamber rod 36B and houses a compensator piston 92 that forms a longitudinal boundary for a compensator chamber 90 therein. A port 46B is formed in the control chamber rod 36B. Thus, the cavity 94 is also open to ambient conditions on a distal side of the compensator piston 92 from the compensator chamber 90.

On the other side of the seal plate 178 from the ambient chamber 44, a dividing retainer plate 34 is formed or otherwise coupled with a control chamber rod 36A. The dividing retainer plate 34 forms a second control chamber 32 on one side of the retainer plate 34 between the seal plate 178 and the retainer plate, and a first control chamber 28 in the cavity 16A on the other side of the retainer plate. A bias element 38 can be disposed in the first control chamber 28 to bias the plate 34, so that the spool 14 engages a seal plate 8 in the deactivated rest position. The control chamber rod 36A is formed with a cavity suitable to overlap the control chamber rod 36B and be coupled therewith.

The control chamber 28 is fluidically coupled to the compensator chamber 90 by one or more flow restrictors. For example, a first flow restrictor 126A is coupled to a first flow path to the chamber portion 90B and then to the chamber portion 90A (collectively chamber 90) and in at least one embodiment can be a uni-directional check valve that is closed to a flow from the chamber 28 into the chamber 90, and open in the reverse direction. A second flow restrictor 126B can be fluidicly coupled between the chamber 28 and the chamber 90 to restrict flow therebetween and can be bi-directional, such as with an orifice.

A flow path 188 is formed between the inner periphery of the cavity in the control chamber rod portion 36A and the outer periphery of the control chamber rod portion 36B. The flow path 188 is fluidically coupled with the compensator chamber 90 and the second control chamber 32 with flow restrictors 136A and 136B disposed in the flow path. For example, in the embodiment shown, the flow restrictor 136A can be coupled between the compensator chamber portion 90B and the chamber 32 and can be a check valve that is open for fluid flowing from the compensator chamber portion 90B into the control chamber 32 but closed for flow in the reverse direction. Another flow restrictor 136B can be coupled between compensator chamber portion 90B and the control chamber 32 to restrict flow therebetween and can be bi-directional, such as with an orifice.

In operation for an actuating stroke, the fluid in the pilot chamber 22 can force the pilot piston 26 to move and compress the control chamber 28. Fluid in the control chamber 28 does not flow through the closed flow restrictor 126A, but can flow in a restricted manner through the flow restrictor 126B into the compensator chamber portion 90B to control the speed of the actuating stroke and then to the compensator chamber portion 90A. Further, fluid can flow through the open flow restrictor 136A, and to some extent the restricted flow path through the flow restrictor 136B, into the control chamber 32. On the return stroke, fluid in the control chamber 32 is blocked from flowing through the flow restrictor 136A, but can flow in a restricted manner through the flow restrictor 136B to control the speed of the return stroke, through the compensator chamber portion 90B, through the open flow restrictor 126A and to some extent the restricted flow path of the flow restrictor 126B, and into the chamber 28. Also, fluid in the compensator chamber portion 90A can flow through the open flow restrictor 126A into the chamber 28. Some fluid may flow through the flow restrictor 126B from the compensator chamber 90 into the chamber 28, but in a restricted flow manner.

The embodiments shown in FIGS. 19A-19B and 20A-20B utilize both the pilot supply fluid and main supply fluid to control the actuating speeds depending on actuating direction. A control chamber is created between the spool and the cage with an arrangement of seals. The chamber is generally filled with main supply fluid. When the pilot supply is pressurized for an actuating stroke, fluid flows across an open flow restrictor, the actuating rod assembly moves and pressurizes the chamber. Fluid is allowed to flow out from the chamber through a restriction that limits the speed of the actuating stroke. When the pilot pressure is removed from the pilot chamber, a bias element causes the actuating rod assembly to move back to a rest position. The pilot line has a flow restrictor installed which is in parallel with the first flow restrictor used when pilot pressure is supplied. The second flow restrictor controls the rate that fluid can flow out of the pilot chamber and therefore controls the speed that the actuating rod assembly can travel on the return stroke. Additional specifics are provided below for the exemplary embodiments.

FIG. 19A is a cross-sectional schematic view of a valve using the teachings of the present invention for a normally closed valve in a retracted position. FIG. 19B is a cross-sectional schematic view of a valve in FIG. 19A in an actuated position. FIGS. 19A-19B includes an exemplary valve 2 with a valve body 4 coupled to the cage 10 with the spool 14 slidably engaged with the wall of the cage 10 and sealed on an end to the seal plate 8. The valve body 4 is an exemplary embodiment for the purposes of FIGS. 19A-19B and 20A-20B to show the different flow paths for a normally-closed and normally-open cage with a flow restrictor incorporated therein. The valve 2 can include a valve body 4 with a pilot port 20 fluidically coupled with a pilot chamber 22 with a pilot piston 26 biased toward the pilot port by a bias element 18. The valve 2 can be include a pilot port 20 coupled to a pilot chamber 22 with a pilot piston 26. A pilot line 168 can be coupled to the pilot port 20. A flow restrictor 104A can be fluidically coupled with the pilot port 20 and can be open to allow flow into the pilot port 20 but closed to block flow out of the pilot port 20. Another flow restrictor 104B can be fluidically coupled with the pilot port 20 in a parallel flow path to the flow restrictor 104A. The flow restrictor 104B can restrict flow in a least one direction and may be bi-directional, such as an orifice.

In FIG. 19A, the assembly is a normally-closed configuration when at a rest position and the valve is not actuated, a supply port 52 is closed from fluid flow through the work port 56 by the spool 14 being sealingly engaged with the seal plate 8 at a first end 68 of the spool. Fluid flow would be allowed to flow from the work port 56 into the return port 54 along a flow path 58A. A control chamber 160 can be formed between a cage second inside diameter 62 and a spool first outside diameter 64 and having chamber ends formed by a step 88 between the spool first outside diameter 64 and the spool second outside diameter 66, and a step 98 formed between the cage first inside diameter 60 and the cage second inside diameter 62. Further, the chamber 160 can be fluidically coupled to a main supply 190 through a flow restrictor 162. The flow restrictor 162 can allow fluids to flow from the main fluid supply 190 into the chamber 160 to fill the chamber.

In operation on the actuating stroke, pilot fluid supplied to the pilot piston 22 pushes the pilot piston 26 to move the spool 14 in the cage 10, thus compressing the chamber 160. The flow restrictor 162 restricts the exiting flow of fluid out of the chamber and thus controls the speed of the actuating stroke. On the return stroke, the pilot pressure is removed from the pilot chamber 22, allowing the bias element 38 to return the valve to a rest position by pushing the pilot piston 26 back to a rest position for the next stroke. However, fluid existing the pilot chamber 22 is blocked by the closed flow restrictor 104A and allowed to flow in a restricted manner through the flow restrictor 104B, thus controlling the return speed of the valve.

Figure 20A:
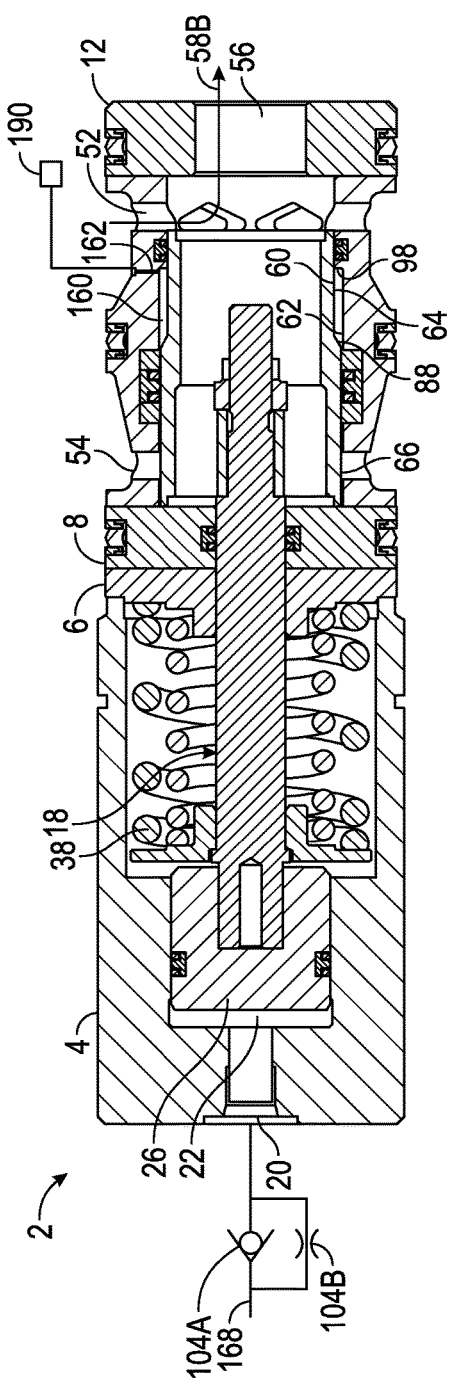
FIG. 20A is a cross-sectional schematic view of a valve using the teachings of the present invention for a normally open valve in a rest position.
Figure 20B:
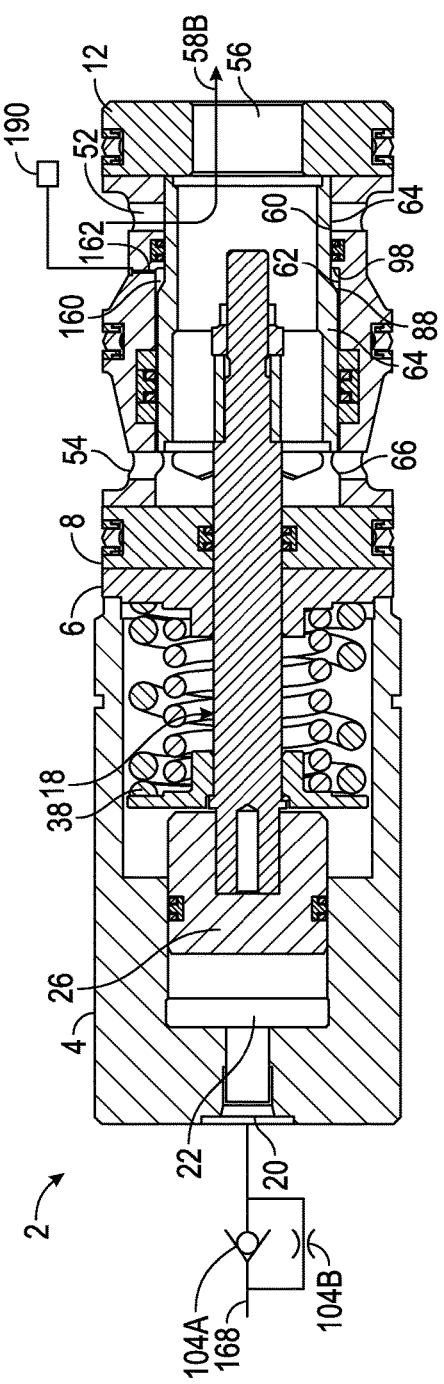
FIG. 20B is a cross-sectional schematic view of a valve in FIG. 20A in an actuated position.

FIG. 20A is a cross-sectional schematic view of a valve using the teachings of the present invention for a normally-open valve in a retracted rest position. FIG. 20B is a cross-sectional schematic view of a valve in FIG. 20A in an actuated position. The embodiment of FIGS. 20A-20B is similarly configured as the exemplary embodiment of FIGS. 19A-19B, except that the supply port 52 and return port 54 are reversed in the orientation on the cage. Thus, the valve would be a normally-open valve, so that in the rest position of the spool 14, fluid can flow from the supply port 52 into the work port 56 along flow path 58B, but restricted from flowing into the return port 54. In a similar manner as described above, the different diameters of the spool and cage form steps to form chamber 160. The flow restrictor 162 can be control the actuation speed and the flow restrictor 104B can control the return speed.

Figure 21A:
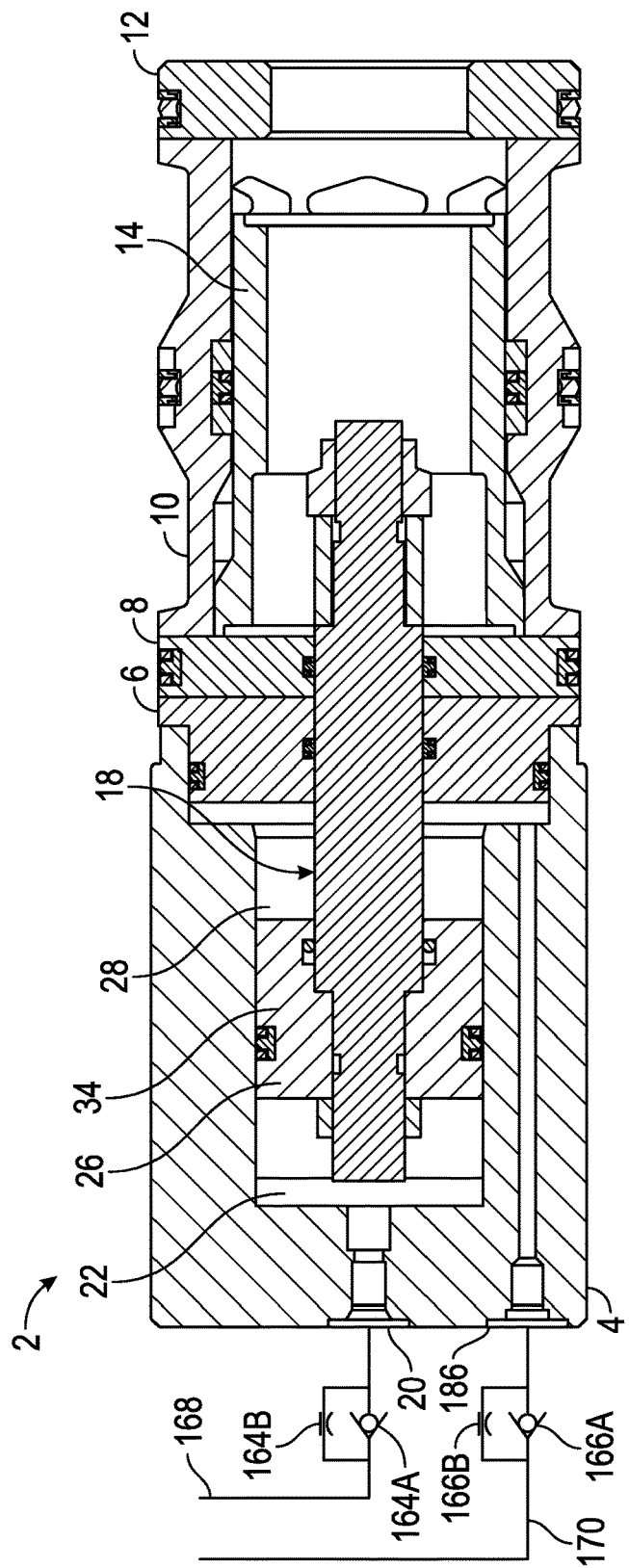
FIG. 21A is a cross-sectional schematic view of a valve using the teachings of the present invention for a double-acting type of valve in a rest position.
Figure 21B:
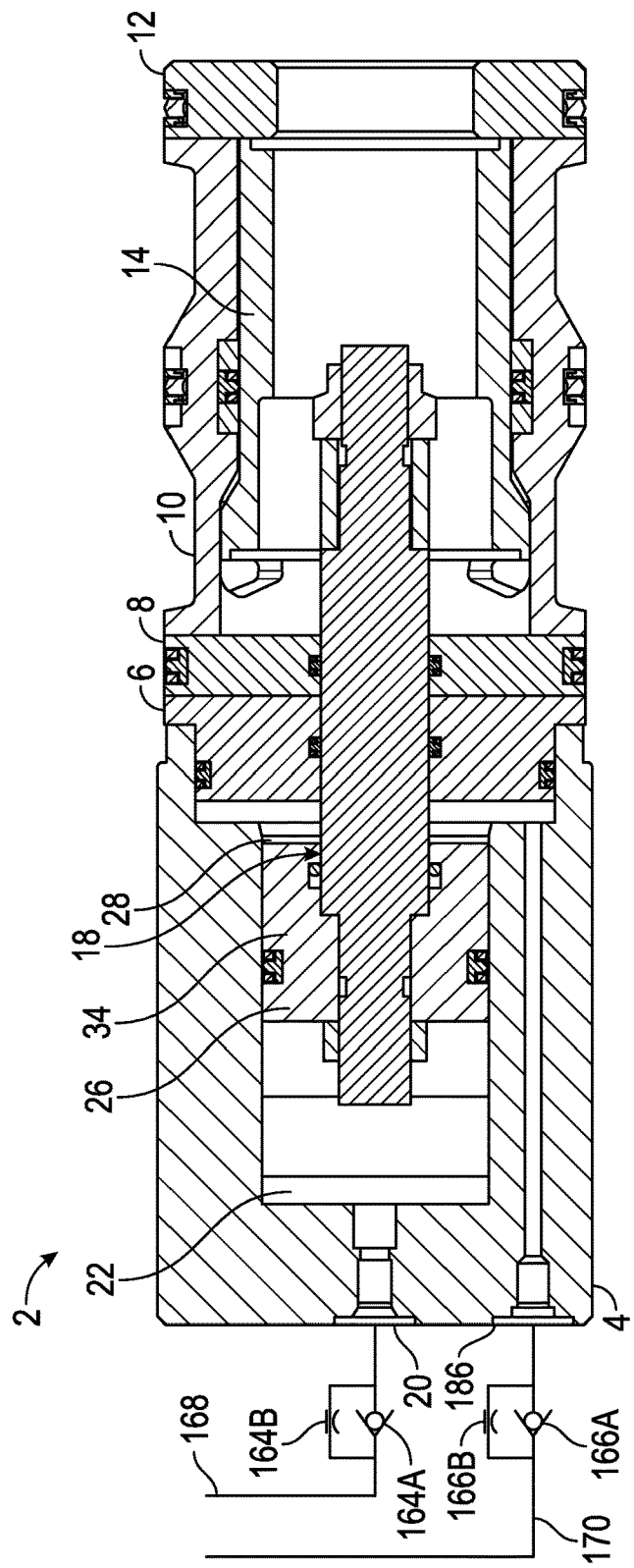
FIG. 21B is a cross-sectional schematic view of a valve in FIG. 21A in an actuated position.

FIG. 21A is a cross-sectional schematic view of a valve using the teachings of the present invention for a double-acting type of valve. FIG. 21B is a cross-sectional schematic view of a valve in FIG. 21A in an actuated position. The embodiment shown in FIGS. 21A-21B is a double-acting style SPM. Generally, there is no spring or other bias element to bias the valve into a selected position. There are two pilot sources used as inputs to select the desired position of the valve. Each pilot supply has a flow restrictor, such as an orifice, with another flow restrictor, such as a bypass check valve or flow control valve, integrated into the SPM valve housing or externally mounted and fluidically coupled with the respective pilot line and pilot port. Depending on which pilot line is supplying pilot pressure to which side of the pilot piston, the fluid can flow out of the pilot chamber or into the pilot chamber with a corresponding flow on the other side of the pilot piston. Fluid flow out of the pilot chamber can be controlled through the flow restrictor coupled to the pilot port for the pilot chamber to control the speed of the valve in that direction. Fluid flow out of the control chamber distal of the pilot chamber relative to the pilot piston can be controlled through the flow restrictor coupled to the pilot port for the control chamber to control the speed of the valve in that opposite direction.

More specifically, the valve 2 includes the valve body 4, having a pilot port 20 fluidically coupled with a pilot chamber 22 bounded by a pilot piston 26. On a distal side of the pilot piston 26 from the pilot chamber 22 is a first control chamber 28. An actuating rod assembly 18, which includes a pilot piston 26, slidably and sealingly engages and passes through the sealing plate 8 that is coupled to the spool 14 inside the cage 10. A first pilot supply line 168 can be fluidically coupled to a pilot flow restrictor 164A and a pilot flow restrictor 164B (collectively 164). The flow restrictor 164 can be fluidically coupled with the pilot port 20. The pilot flow restrictor 164A can be a check valve or flow control valve that is open for incoming pilot fluid to the pilot port 20, but closed to pilot fluid exiting the pilot port 20. The flow restrictor 164B can control fluid exiting the pilot port 20 and in at least one embodiment can be an orifice or other flow restrictor. A second pilot line 170 can be coupled to a flow restrictor 166A and a flow restrictor 166B that are fluidicly coupled to a pilot port 186. Fluid exiting from the pilot port 186 can flow through the flow restrictor 166B, but is blocked from flowing through the flow restrictor 166A.

To move the valve in a first direction, pilot flow would pass through the first pilot line 168, through the open flow restrictor 164A and into the pilot port 20 to push the pilot piston 26 right in the orientation shown in FIG. 21A and shift the spool 14 away from the seal plate 8 and toward the seal plate 12. In such a case, fluid in the control chamber 28 would be pass through the second pilot port 186 and through the restricted flow of the flow restrictor 166B but be blocked by the closed flow restrictor 166A. However, if the flow is reversed in a second direction so that fluid flows through the second pilot line 170 into the second pilot port 186, then the flow restrictor 166A is in an open position and the fluid does not need to pass through the pilot flow restrictor 166B even though some may pass through, even with the higher pressure drop through the flow restrictor. The pilot piston 26 would move in a left direction in the orientation shown in FIG. 21B, corresponding to the return stroke of prior embodiments. As the pilot piston 26 moves left in the exemplary orientation of the figure, fluid exiting the pilot port 20 would be restricted by the flow restrictor 164B while the flow restrictor 164A is closed to control the speed of the valve movement in the second direction. Thus, both directions are controlled by the respective flow restrictors.

Figure 22A:
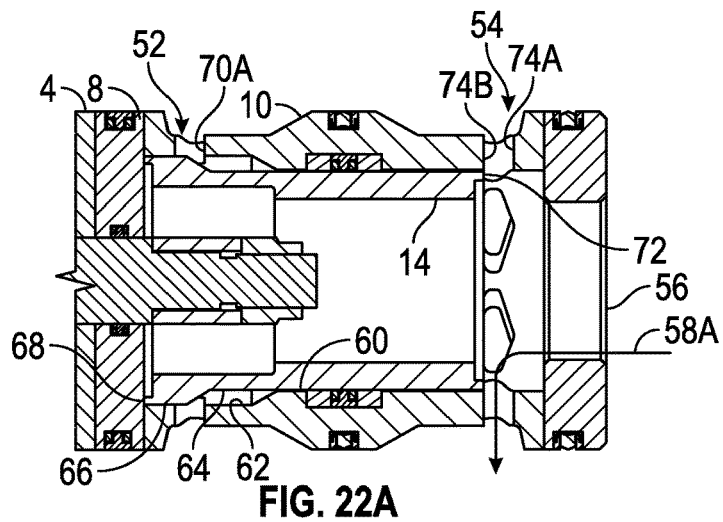
FIG. 22A is a cross-sectional schematic view of a valve having a cage and a spool in a deactivated rest position according to the teachings of the present invention.
Figure 22B:
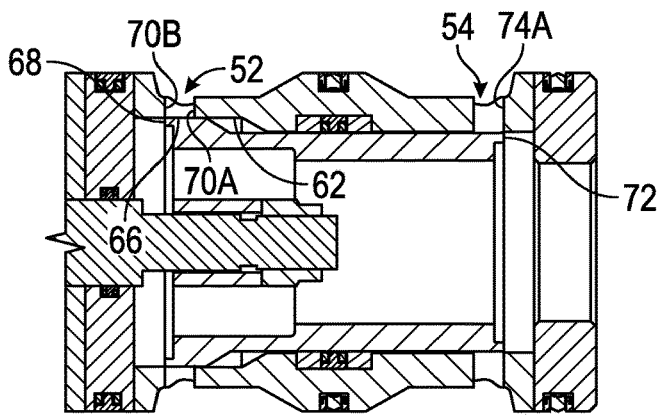
FIG. 22B is a cross-sectional schematic view of a valve having a cage and a spool in a mid-stroke position.
Figure 22C:
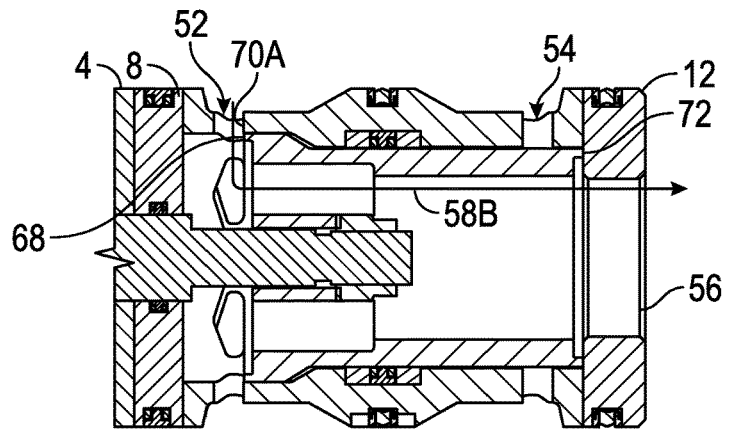
FIG. 22C is a cross-sectional schematic view of a valve having a cage and a spool in an actuated position.

FIG. 22A is a cross-sectional schematic view of a valve having a cage and a spool in an unactuated position according to the teachings of the present invention. FIG. 22B is a cross-sectional schematic view of a valve having a cage and a spool in a mid-stroke position. FIG. 22C is a cross-sectional schematic view of a valve having a cage and a spool in an actuated position. FIGS. 22A-22C represent an exemplary sequence of actuation that shows a spool timing of engagement with a ports of the cage that is contrasted in FIGS. 23A-23C with typical full timing. This invention also involves improvements to the spool and cage clearances, the fluid communication passages (slots/cuts) that are shaped to control the area gain as the spool moves, and the opening/closing timing between the individual fluid passage cuts. The Figures shown are generally of a normally closed style SPM. These kinds of improvements will also apply to a normally open style SPM. In the exemplary Figures shown, the clearances (radial/diametral) are generally designed to be very close as to greatly reduce the axial flow path between the spool and cage. The close clearances help to minimize flow in this area during spool travel which would otherwise degrade the timing position between opening and closing of the radial flow passage cuts.

In FIG. 22A, the spool 14 is in a retracted closed position, so that a spool first end 68 is sealingly engaged with the seal plate 8. In that position, the supply port 52 (or return port 54 if the valve is a normally open valve) is shut off by the spool. Consequently, the return port 54 and the work port 56 open so that flow from the work port 56 can flow into the return port 54 through the flow path 58A. To facilitate full flow though the return port 54, a spool second end 72 can be retracted so that it is not protruding into the flow area of the 54, that is, the spool end 72 is even or retracted relative to the port edge B of the return port. In the exemplary embodiment, the cage has a first inside diameter 60 that is smaller than a second inside diameter 62 that forms a step in the diameters. The spool has a corresponding first outside diameter 64 and a second outside diameter 66. The spool outside diameters are sized to fit within the first and second inside diameters consecutively. Of note, the diameters 60 and 62 and 64 and 66 are closely dimensioned so that little flow, at the most, occurs between the annular space of the diameters. This closer conformance of dimensions is generally avoided by those in the art, but in the present application, can add efficiency by reducing unwanted flow paths. Further, the spool second outside diameter 66 can seal across the supply port 52 in the cage 10, and the spool first outside diameter 64 can seal across the return port 54 at the cage first inside diameter 60.

In FIG. 22B, the spool has been actuated and is in a mid-stroke position. The spool is sized lengthwise, sufficient so that both ports 52 and 54 are closed. In the exemplary embodiment, the spool first end 68 can be aligned with a port edge 70A of the supply port 52 and the spool second end 72 can be aligned with the port edge 74A of the return port 54. By being "aligned," the length of the spool might extend slightly beyond the respective port edges sufficiently to stop flow through both ports. Any spool movement one way or the other will expose a small portion of the ports. This arrangement of spool ends and cage port edges allows the transition from one flow path to another to be quick which reduces interflow and loss of usable supply fluid to the return port.

In FIG. 22C, the spool has been fully actuated so that the spool second end 72 can engage with the seal plate 12 at the end of its stroke. In this position, the return port 54 is closed off and the supply port 52 is fully open with the work port 56 to establish a flow path 58B in this position, the spool first end 68 avoids protrusion into the flow area of the supply port 52, that is, the spool first end 68 does not extend beyond the port edge 70A of the supply port.

Figure 23A:
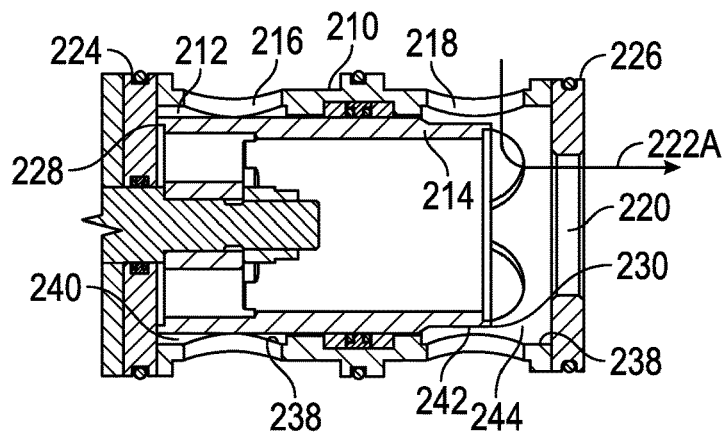
FIG. 23A is a cross-sectional schematic view of a prior art valve having a cage and a spool in a rest position for comparison with the cage and spool of FIG. 22A.

FIG. 23A is a cross-sectional schematic view of a prior art valve having a cage and a spool in an unactuated position for comparison with the cage and spool of FIG. 22A. In contrast to the spool timing illustrated in FIGS. 22A-22C of the present invention, the typical spool timing creates additional and unwanted flow paths. The spool 214 is enclosed within the cage 210. A spool first end 228 is sealingly engaged with the seal plate 224 at one end of a stroke. The supply port 216 is shut off by the sealing engagement of the spool with the seal plate 224. Thus, flow path 222A exists between the return port 218 and the work port 220. The outer diameter of the spool 236 is generally observably less than the cage inner diameter 238 that forms an annulus 240 therebetween near the first end 228 of the spool. On the opposite end of the spool, the spool forms a second outside diameter 242 that is even more significantly less than the cage inside diameter 238 that forms a larger annulus 244 therebetween.

Figure 23B:
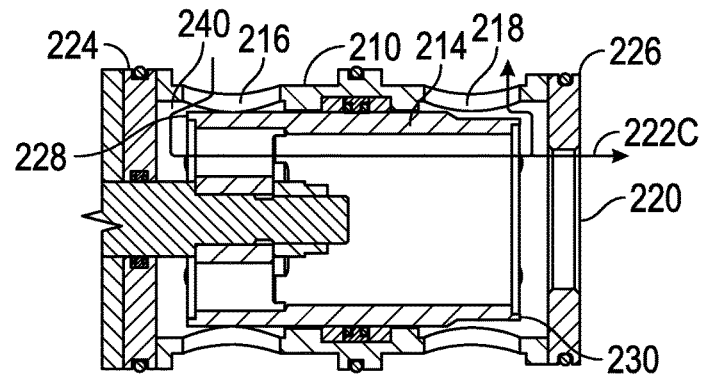
FIG. 23B is a cross-sectional schematic view of a valve having a case and a spool in a mid-stroke position for comparison with the cage and spool of FIG. 22B.

FIG. 23B is a cross-sectional schematic view of a valve having a case and a spool in a mid-stroke position for comparison with the cage and spool of FIG. 22B. The first end 228 of the spool is not engaged with the seal plate 224 and the second end of the spool is not engaged with the seal plate 226. However, due to the annulus 240 between the spool and cage diameters, a large annular flow can occur along flow path 222C. Flow through the supply port 216 can flow around the end 228 and through the middle of the spool to exit both the return port 218 and the work port 220. The large annular flow is essentially a leakage, because the return port is typically at little to no pressure and thus, the fluid to the work port is unable to perform any work.

Figure 23C:
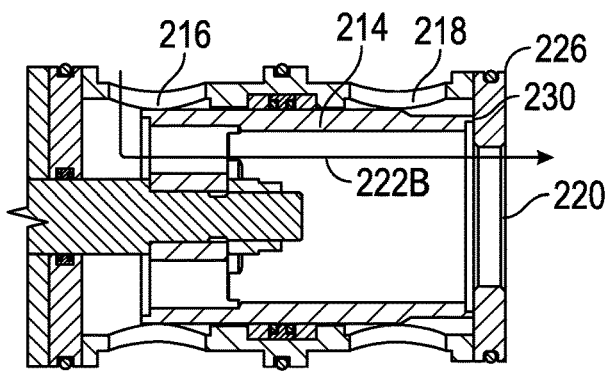
FIG. 23C is a cross-sectional schematic view of a valve having a case and a spool in an actuated position for comparison with the cage and spool of FIG. 22C.

FIG. 23C is a cross-sectional schematic view of a valve having a case and a spool in an actuated position for comparison with the cage and spool of FIG. 22C. In FIG. 23C, the spool is at the end of its stroke, so that the spool end 230 is sealingly engaged with the seal plate 226. Fluid flow can occur through the supply port 216 into the spool 214 and then through the work port 220, but not the return port 218.

FIGS. 23A-23C show the typical SPM valve spool in the three positions described above. This visually shows the differences between the new SPM spool of the present invention and cage clearances and spool timing compared the current SPM spool and cage clearances and spool timing. It can be seen that as soon as the typical SPM spool starts to shift interflow between the supply port, return port, and work port begins resulting in lost supply fluid to the return port.

Figure 24A:
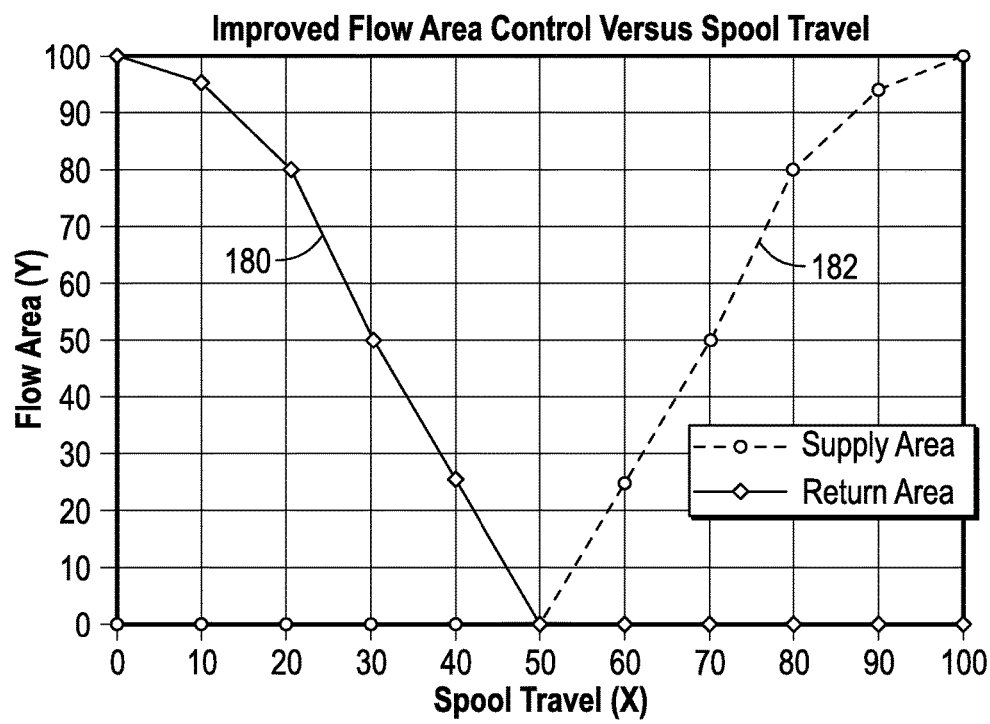
FIG. 24A is an exemplary computer modeled graph of flow area versus spool travel for an exemplary valve with the cage and spool shown in FIG. 22A of the present invention.
Figure 24B:
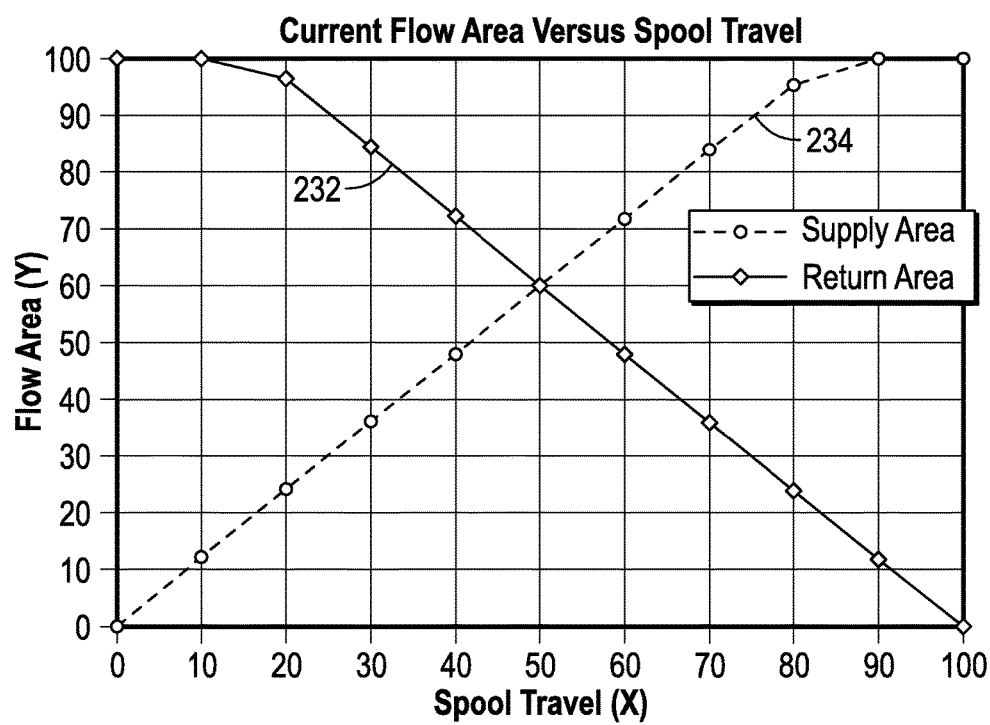
FIG. 24B is an exemplary computer modeled graph of flow area versus spool travel for an exemplary prior art valve with the cage and spool shown in FIG. 23A for comparison with the flow area versus spool travel of FIG. 24A.

FIGS. 24A and 24B graphically show the approximation of the spool timing and area gains of the new SPOM valve versus the typical SPM valve arrangement. FIG. 24A is an exemplary computer modeled graph of flow area versus spool travel for an exemplary valve with the cage and spool shown in FIG. 22A of the present invention. In FIG. 24A, the effects of the spool timing described in FIGS. 22A-22C are illustrated. The return area at 100% is fully open and the flow area decreases as the spool is actuated along curve 180 and reaches zero flow at 50% travel where, in the illustrated embodiment, both ports are closed. FIG. 24B is an exemplary computer modeled graph of flow area versus spool travel for an exemplary prior art valve with the cage and spool shown in FIG. 23A for comparison with the flow area versus spool travel of FIG. 24A. As the spool continues to be actuated and starts to uncover the flow area of the supply port 52, the flow area begins to open along curve 182. The valve never reaches a zero flow, but rather reduces only to about 60% flow before the supply area in curve 234 starts increasing beyond the flow area of the return port. Thus, a typical SPM valve only controls a flow area between the flow rates of 60% to 100%, whereas the new SPM valve of the present invention can control the full scope of the flow regime.

Other and further embodiments utilizing one or more aspects of the invention described above can be devised without departing from the spirit of Applicant's invention. For example, other types of valves, restrictors, check valves, chambers, configurations for normally open and normally closed, different shapes cages and spools, and return mechanisms after actuation, as well as other variations can occur in keeping within the scope of the claims.

Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalents of the following claims.

What is claimed is:

1. A subplate mounted (SPM) valve comprising:
   a valve body having pilot port;
   a piston configured to be actuated by fluid from the pilot port;
   a valve chamber in fluid communication with the pilot port, the piston being slidably disposed in the valve chamber;
   a first control chamber formed in the body, wherein a seal coupled to the piston divides the valve chamber from the first control chamber;
   a first flow restrictor fluidicly disposed between the valve chamber and the first control chamber configured to restrict flow in at least one direction between the valve chamber and the first control chamber;
   a bias element disposed in the first control chamber;
   a cage coupled to the body and having a supply port, a return port, and a work port; and
   a spool slidably engaged with the cage and configured to selectively restrict flow between the supply port and the return port by actuation of the piston.

2. The valve of claim 1, wherein the valve chamber comprises a pilot chamber fluidicly coupled to the pilot port, a second control chamber, or a compensator chamber fluidicly coupled to the first control chamber or the second control chamber, or a combination thereof.

3. The valve of claim 1, wherein the valve chamber comprises a pilot chamber fluidicly coupled to the pilot port, and further comprising a second control chamber formed in the body and fluidicly coupled to the first control chamber with a second flow restrictor disposed between the first control chamber and the second control chamber configured to restrict flow in at least one direction between the first control chamber and the second control chamber.

4. The valve of claim 1, wherein the valve chamber comprises a second control chamber, with the first flow restrictor fluidicly disposed between the second control chamber and the first control chamber to restrict flow in at least one direction between the second control chamber and the first control chamber.

5. The valve of claim 4, further comprising a compensator chamber fluidicly coupled to the second control chamber and a second flow restrictor disposed between the first control chamber and the second control chamber configured to restrict flow in at least one direction between the compensator chamber and the second control chamber.

6. The valve of claim 5, wherein the compensator chamber comprises an initial volume of makeup fluid prior to actuation of the valve.

7. The valve of claim 1, wherein the valve chamber comprises a compensator chamber, with the first flow restrictor fluidicly disposed between the compensator chamber and the first control chamber to restrict flow in at least one direction between the compensator chamber and the first control chamber.

8. The valve of claim 7, further comprising a second control chamber fluidicly coupled to the compensator chamber and a second flow restrictor disposed between the compensator chamber and the second control chamber configured to restrict flow in at least one direction between the compensator chamber and the second control chamber.

9. The valve of claim 7, wherein the compensator chamber is externally coupled to the valve body.

10. The valve of claim 1, wherein the bias element is configured to return the piston to a rest position after pilot fluid has actuated the piston into an actuated position.

11. The valve of claim 1, wherein the first flow restrictor comprises a uni-directional flow restrictor.

12. The valve of claim 1, wherein the first flow restrictor comprises a bi-directional flow restrictor.

13. The valve of claim 1, further comprising an ambient pressure equalization port coupled to a pressure equalization chamber in the body.

14. The valve of claim 1, wherein the spool is configured to selectively restrict flow between the supply port and the return port by actuation of the piston during a valve stroke and is sized to overlap both the supply port and the return port at the same time during a portion of the valve stroke.

15. A subplate mounted (SPM) valve comprising:
a valve body configured to be coupled to a supply of fluid;
a pilot port in the body;
a pilot chamber in the body and fluidicly coupled to the pilot port;
a piston configured to be actuated by fluid in the pilot chamber from the pilot port;
a valve chamber in fluid communication with the pilot port;
a cage coupled to the body and having a supply port, a return port, and a work port;
a spool slidably engaged with the cage and configured to selectively restrict flow between the supply port and the return port by actuation of the piston;
a spool chamber formed between the cage and the spool and fluidicly coupled with the supply of fluid independently from the pilot port; and
a first flow restrictor received in the piston and configured to restrict flow in at least one direction between the valve chamber and a first control chamber formed in the valve body.

16. The valve of claim 15, wherein the spool is configured to selectively restrict flow between the supply port and the return port by actuation of the piston during a valve stroke and is sized to overlap both the supply port and the return port at the same time during a portion of the valve stroke.

17. A subplate mounted (SPM) valve comprising:
a valve body having pilot port;
a rod assembly comprising a piston configured to be actuated by fluid from the pilot port;
a valve chamber in fluid communication with the pilot port, the piston being slidably disposed in the valve chamber;
a first control chamber formed in the body, wherein the rod assembly extends through first control chamber;
a first flow restrictor fluidicly disposed between the valve chamber and the first control chamber configured to restrict flow in at least one direction between the valve chamber and the first control chamber;
a cage coupled to the body and having a supply port, a return port, and a work port; and
a spool slidably engaged with the cage and configured to selectively restrict flow between the supply port and the return port by actuation of the piston;
wherein the piston has a first position in the valve body and a second position in the valve body that is spaced from the first position;
wherein the first control chamber has a first volume when the piston is in the first position and a second volume that is different from the first volume when the piston is in the second position.

18. The valve of claim 17, wherein the valve chamber comprises a pilot chamber fluidicly coupled to the pilot port, a second control chamber, or a compensator chamber fluidicly coupled to the first control chamber or the second control chamber, or a combination thereof.

19. The valve of claim 17, further comprising a bias element disposed in the first control chamber.

* * * * *